(12) United States Patent
Hisakado et al.

(10) Patent No.: US 8,350,996 B2
(45) Date of Patent: Jan. 8, 2013

(54) OPTICAL COMPENSATION SHEET, POLARIZING PLATE AND TN-MODE LIQUID CRYSTAL DISPLAY DEVICE

(75) Inventors: Yoshiaki Hisakado, Minami-Ashigara (JP); Yoji Ito, Minami-Ashigara (JP); Tomonori Ichinose, Minami-Ashigara (JP); Ryosuke Miyauchi, Minami-Ashigara (JP)

(73) Assignee: FUJIFILM Corporation, Minato-Ku, Tokyo (JP)

(*) Notice: Subject to any disclaimer, the term of this patent is extended or adjusted under 35 U.S.C. 154(b) by 995 days.

(21) Appl. No.: 12/167,617

(22) Filed: Jul. 3, 2008

(65) Prior Publication Data

US 2009/0009866 A1  Jan. 8, 2009

(30) Foreign Application Priority Data

Jul. 6, 2007 (JP) ................. 2007-178385

(51) Int. Cl.
*G02F 1/1335* (2006.01)
(52) U.S. Cl. .......................... 349/117; 349/96
(58) Field of Classification Search ........... 349/117, 349/96
See application file for complete search history.

(56) References Cited

U.S. PATENT DOCUMENTS

| | | | |
|---|---|---|---|
| 6,917,396 B2* | 7/2005 | Hiraishi et al. | 349/64 |
| 2006/0164580 A1* | 7/2006 | Ueda et al. | 349/117 |
| 2007/0020407 A1* | 1/2007 | Umemoto et al. | 428/1.31 |
| 2007/0155922 A1* | 7/2007 | Ebata et al. | 526/171 |
| 2007/0182895 A1* | 8/2007 | Fukagawa et al. | 349/117 |
| 2008/0177056 A1 | 7/2008 | Hashimoto et al. | |
| 2009/0153777 A1* | 6/2009 | Park et al. | 349/64 |

FOREIGN PATENT DOCUMENTS

| | | |
|---|---|---|
| CN | 1908772 A | 2/2007 |
| CN | 1946779 A | 4/2007 |
| JP | 8-50206 A | 2/1996 |
| JP | 2002-022942 A | 1/2002 |
| JP | 2003-279736 A | 10/2003 |
| WO | WO 2006/030954 A1 | 3/2006 |

OTHER PUBLICATIONS

Office Action from the State Intellectual Property Office of the People's Republic of China issued in corresponding Chinese Patent Application No. 200810135625.3 dated Apr. 21, 2011, with an English translation.
Chinese Office Action issued on Oct. 17, 2012, in corresponding Chinese Patent Application No. 200810135625.3, and partial English translation thereof.

* cited by examiner

*Primary Examiner* — Nathanael R Briggs
(74) *Attorney, Agent, or Firm* — Buchanan Ingersoll & Rooney PC

(57) ABSTRACT

An optical compensation sheet for a TN-mode liquid crystal display device is provided and includes a transparent film including one or more layers, and the optical compensation sheet satisfies formulae (1) and (2).

$$40 \leq Re(550) \leq 130 \quad (1)$$

$$100 \leq Rth(550) \leq 200 \quad (2)$$

$Re(\lambda)$ is an in-plane retardation value for light at a wavelength of $\lambda$ nm, and $Rth(\lambda)$ is a retardation vale in a thickness direction for light at a wavelength of $\lambda$ nm.

6 Claims, 1 Drawing Sheet

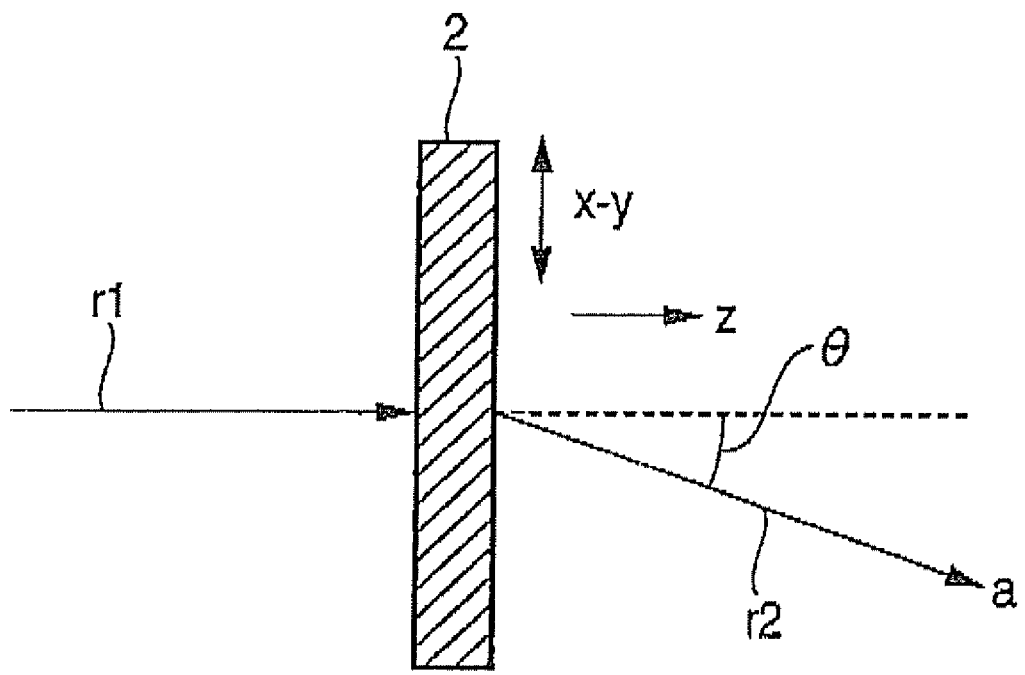

OPTICAL COMPENSATION SHEET, POLARIZING PLATE AND TN-MODE LIQUID CRYSTAL DISPLAY DEVICE

This application is based on and claims priority under 35 U.S.C §119 from Japanese Patent Application No. JP2007-178385 filed on Jul. 6, 2007, the entire disclosure of which is herein incorporated by reference.

BACKGROUND OF THE INVENTION

1. Field of the Invention

The present invention relates to an optical compensation sheet and a polarizing plate, which are used for a TN-mode liquid crystal display device. The present invention also relates to a TN-mode liquid crystal display device having the optical compensation sheet or polarizing plate.

2. Description of Related Art

Various optical compensation sheets including a transparent support having thereon an optically anisotropic layer formed of a liquid crystal composition have been proposed as an optical compensation sheet for a TN-mode liquid crystal display device, For example, JP-A-8-50206 has proposed an optical compensation sheet including a transparent support having provided thereon an optically anisotropic layer, in which the optically anisotropic layer is a layer having a negative birefringence and including a compound having a discotic structural unit, the disc plane of the discotic structural unit is inclined with respect to the transparent support plane, and the angle made by the disc plane of the discotic structural unit and the transparent support plane is being changed in the depth direction of the optically arisotropic layer.

The TN-mode liquid crystal display device using an optical compensation film including an optically anisotropic layer on a transparent support can realize a high contrast and a wide contrast-viewing angle, but in view of production, a step of coating the optically anisotropic layer on the transparent support is included and this involves a high cost and gives rise to increase in the unit price of a liquid crystal panel. Therefore, there has been proposed a TN-mode liquid crystal display device using an optical compensation layer obtained by imparting optical characteristics to the transparent support without forming an expensive layer such as a layer formed of a liquid crystal layer composition as described above (JP-A-2002-22942).

However, the TN-mode liquid crystal display device using an optical compensation layer of a transparent support having optical characteristics is significantly decreased in the display performance as compared with a TN-mode liquid crystal display device using an optical compensation film including an optically anisotropic layer. In particular, tone reversal in the downward direction of the panel, or color tinting in the oblique direction at the display in black or halftone, which are peculiar to the TN mode, is a serious problem. As for means for improving the tone reversal, a technique of using a surface diffusing film on the viewing side of the liquid crystal panel has been proposed (JP-A-2003-279736), but means for improving the change in color tint has not been studied.

SUMMARY OF THE INVENTION

An object of an illustrative, non-limiting embodiment of the present invention is to provide an optical compensation for TN mode, and a polarizing plate for TN mode and a liquid crystal display device using the optical compensation sheet, which are inexpensive and improved in the viewing angle compensating ability and viewing angle-dependent color tint change.

1. An optical compensation sheet for a TN-mode liquid crystal display device, comprising a transparent film including one or more layers, wherein the optical compensation sheet satisfies formulae (1) and (2):

$$40 \leq Re(550) \leq 130 \tag{1}$$

$$100 \leq Rth(550) \leq 200 \tag{2}$$

wherein $Re(\lambda)$ is an in-plane retardation value for light at a wavelength of $\lambda$ nm, and $Rth(\lambda)$ is a retardation vale in a thickness direction for light at a wavelength of $\lambda$ nm.

2. The optical compensation sheet as described in item 1 above, further satisfying formulae (3) and (4).

$$70 \leq Re(550) \leq 110 \tag{3}$$

$$100 \leq Rth(550) \leq 150 \tag{4}$$

3. The optical compensation sheet as described in item 1 or 2, further satisfying formulae (5) and (6).

$$Re(630) - Re(450) > 0 \tag{5}$$

$$Rth(630) - Rth(450) > 0 \tag{6}$$

4. The optical compensation sheet as described in item 3 or 2, further satisfying formulae (7) and (8);

$$Re(630) - Re(450) \leq 0 \tag{7}$$

$$Rth(630) - Rth(450) \leq 0 \tag{8}$$

5. The optical compensation sheet as described in any one of items 1 to 4, which contains a cellulose acylate having substitution degrees satisfying formulae (9) to (11):

$$2.0 \leq X+Y \leq 3.0 \tag{9}$$

$$0 \leq X \leq 2.0 \tag{10}$$

$$0 \leq Y \leq 1.5 \tag{11}$$

wherein X represents a substitution degree of an acetyl group, and Y represents a total substitution degree of a propionyl group, a butyryl group, a pentanoyl group and a hexanoyl group.

6. The optical compensation sheet as described in any one of items 1 to 5, which contains a cellulose acylate and a retardation raising agent.

7. The optical compensation sheet as described in any one of items 1 to 4, which contains a cycloolefin polymer.

8. The optical compensation sheet as described in any one of items 1 to 4, wherein the transparent film is a birefringent film including a birefringent layer containing a non-liquid crystalline polymer.

9. A polarizing plate comprising a polarizer and a pair of protective films sandwiching the polarizer, wherein at least one of the protective films includes an optical compensation sheet described in any one of items 1 to 8.

10. A TN-mode liquid crystal display device comprising a polarizing plate described in item 9.

11. A polarizing plate for a TN-mode liquid crystal display device, comprising:
a polarizer;
a pair of protective films sandwiching the polarizer, at least one of the protective films including an optical compensation sheet satisfying formulae (1) and (2); and
a scattering film on a side opposite to the optical compensation sheet across the polarizers the scattering film satisfying formula (12):

$$40 \leq Re(550) \leq 130 \quad (1)$$

$$100 \leq Rth(550) \leq 200 \quad (2)$$

$$\text{Haze value} \geq 30\% \quad (12)$$

wherein $Re(\lambda)$ is an in-plane retardation value for light at a wavelength of $\lambda$ nm, $Rth(\lambda)$ is a retardation vale in a thickness direction for light at a wavelength of $\lambda$ nm, and the haze value indicates a haze value of the scattering film in a direction 30% inclined with respect to a normal direction of the scattering film.

12. The polarizing plate as described in item 11, wherein the optical compensation sheet satisfies formulae (3) and (4).

$$70 \leq Re(550) \leq 110 \quad (3)$$

$$100 \leq Rth(550) \leq 150 \quad (4)$$

13. The polarizing plate as described in item 11 or 12, wherein the optical compensation sheet satisfies formulae (5) and (6).

$$Re(630)-Re(450)>0 \quad (5)$$

$$Rth(630)-Rth(450)>0 \quad (6)$$

14. The polarizing plate as described in item 11 or 12, wherein the optical compensation sheet satisfies the formulae (7) and (8).

$$Re(630)-Re(450) \leq 0 \quad (7)$$

$$Rth(630)-Rth(450) \leq 0 \quad (8)$$

15. The polarizing plate as described in any one of items 11 to 14, wherein the optical compensations sheet contains a cellulose acylate having substitution degrees satisfying formulae (9) to (11):

$$2.0 \leq X+Y \leq 3.0 \quad (9)$$

$$0 \leq X \leq 2.0 \quad (10)$$

$$0 \leq Y \leq 1.5 \quad (11)$$

wherein X represents a substitution degree of an acetyl group, and Y represents a total substitution degree of a propionyl group, a butyryl group, a pentanoyl group and a hexanoyl group.

16. The polarizing plate as described in any one of items 11 to 14, wherein the optical compensation sheet contains a retardation raising agent.

17. The polarizing plate as described in any one of items 11 to 14, wherein the optical compensation sheet contains a cycloolefin polymer.

18. The polarizing plate as described in any one of items 11 to 14, wherein the transparent film is a birefringent film including a birefringent layer containing a non-liquid crystalline polymer.

19. A TN-mode liquid crystal display device comprising a polarizing plate described in any one of items 11 to 18.

BRIEF DESCRIPTION OF THE DRAWINGS

The sole FIGURE is a conceptual view showing the state of incident light (r1) on the anisotropic light scattering film (2) being transmitted as scattered light.

DETAILED DESCRIPTION OF THE EXEMPLARY EMBODIMENTS

According to an exemplary embodiment of the present invention, the viewing angle compensating ability and viewing angle-dependent color tint change can be improved by using an optical compensation sheet for TN mode having optical characteristics of items 1 to 4 above.

The optical characteristics of items 1 to 4 above can be obtained by applying a cellulose acylate satisfying the substitution degrees specified in item 5 above, using the additive specified in item 6 above, or applying a material specified in item 7 above. Further, the viewing angle compensating ability and viewing angle-dependent color tint change can be more improved when the transparent film is applied simultaneously with the scattering film.

Exemplary embodiments of the present invention are described in detail below. Incidentally, the expression "from (a numerical value) to (a numerical value)" or "(a numerical value) to (a numerical value)" as used in the present specification includes the earlier and later values as the lower limit and the upper limit, respectively.

In the present specification, $Re(\lambda)$ and $Rth(\lambda)$ indicate the in-plane retardation and the retardation in the thickness direction of a film, respectively, at a wavelength of $\lambda$. $Re(\lambda)$ is measured by making light at a wavelength of $\lambda$ nm to be incident to the film normal direction in KOBRA 21ADH or WR (trade name, manufactured by Oji Scientific Instruments). As for the selection of the measurement wavelength $\lambda$ nm, the measurement can be performed by manually exchanging the wavelength selection filter or converting the measured value by a program or the like.

In the case where the film measured is a film expressed by a uniaxial or biaxial refractive index ellipsoid, the $Rth(\lambda)$ is calculated by the following method.

The above-described $Re(\lambda)$ is measured at 6 points in total by making light of a wavelength of $\lambda$ nm to be incident from directions inclined with respect to the film normal direction in 10° steps up to 50° on one side from the normal direction with the inclination axis (rotation axis) being the in-plane slow axis (judged by KOBRA 21ADH or WR) (when the slow axis is not present, an arbitrary direction in the film plane is used as the rotation axis) and $Rth(\lambda)$ is calculated by KOBRA 21ADH or WR based on the retardation values measured, the assumed values of average refractive index and the film thickness values input.

In the above, when the film has a direction where the retardation value becomes zero at a certain inclination angle from the normal direction with the rotation axis being the in-plane slow axis, the retardation value at an inclination angle larger than that inclination angle is calculated by KOBRA 21ADH or WR after converting its sign into a negative sign.

Incidentally, after measuring the retardation value from two arbitrary inclined directions by using the slow axis as the inclination axis (rotation axis) (when the slow axis is not present, an arbitrary direction in the film plane is used as the rotation axis), Rth can also be calculated based on the values obtained, the assumed values of average refractive index and the film thickness values input, according to the following mathematical formulae (1) and (2).

$$Re(\theta)\left[nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}}\right] \times \frac{d}{\cos\left\{\sin^{-1}\left(\frac{\sin(-\theta)}{nx}\right)\right\}} \quad \text{Mathematical Formula (1)}$$

$$Rth = \left[\frac{nx+ny}{2} - nz\right] \times d \quad \text{Mathematical Formula (2)}$$

In the formulae, $Re(\theta)$ represents the retardation value in the direction inclined at an angle of $\theta$ from the normal direction, nx represents the refractive index in the in-plane slow axis direction, ny represents the refractive index in the direction crossing with nx at right angles in the plane, nz represents the refractive index in the direction crossing with nx and ny at right angles, and d represents the thickness of the film.

In the case where the film measured is a film incapable of being expressed by a uniaxial or biaxial refractive index ellipsoid or a film not having a so-called optic axis, $Rth(\lambda)$ is calculated by the following method.

$Re(\lambda)$ is measured at 11 points by making light of a wavelength of $\lambda$ nm to be incident from directions inclined with respect to the film normal direction in 10° steps from −50° to +50° with the inclination axis (rotation axis) being the in-plane slow axis nudged by KOBRA 21ADH or WR), and $Rth(\lambda)$ is calculated by KOBRA 21ADH or WR based on the retardation values measured, the assumed values of average refractive index and the film thickness values input.

In the measurements above, as for the assumed value of average refractive index, the values described in *Polymer Handbook* (John Wiley & Sons, Inc.) and catalogues of various optical films can be used. The average refractive index of which value is unknown can be measured by an Abbe refractometer. For example, the values of average refractive index of main optical films are as follows:

cellulose acylate (1.48), cycloolefin polymer (1.52), polycarbonate (1.59), polymethyl methacrylate (1.49) and polystyrene (1.59).

When such an assumed value of average refractive index and the film thickness are input, KOBRA 21 ADH or WR calculates nx, ny and nz and from these calculated nx, ny and nz.

In the present specification, when the measurement wavelength is not specifically denoted, the retardation indicates Re or Rth for light of a wavelength of 550 nm.

<Optical Compensation Sheet>

An optical compensation sheet of the present invention is an optical compensation sheet for a TN-mode liquid crystal display device, and includes a transparent film for at least one layer. The optical compensation sheet preferably satisfies the following formulae (1) and (2), and preferably formulae (3) and (4):

$$40 \leq Re(550) \leq 130 \quad (1)$$

$$100 \leq Rth(550) \leq 200 \quad (2)$$

$$70 \leq Re(550) \leq 110 \quad (3)$$

$$100 \leq Rth(550) \leq 150 \quad (4)$$

Also, from the standpoint of improving the color tint in the oblique direction at the display in black, the optical compensation sheet more preferably satisfies the following formulae.

$$Re(630) - Re(450) > 0 \quad (5)$$

$$Rth(630) - Rth(450) > 0 \quad (6)$$

On the other hand, in view of color tint in the oblique direction at the display in halftone, the optical compensation sheet preferably satisfies the following formulae. It is necessary to use separate characteristics of the optical compensation sheet as required according to the design of display performance.

$$Re(630) - Re(450) \leq 0 \quad (7)$$

$$Rth(630) - Rth(450) \leq 0 \quad (8)$$

<Transparent Film>

In the present invention, an optical compensation sheet containing cellulose acylate can be used. In this case, in order to satisfy formulae (1) to (6), the optical characteristics may be satisfied by adjusting the substitution degree of cellulose acylate or using a retardation raising agent.

(Substitution Degree of Cellulose Acylate)

One example of the optical compensation sheet is a cellulose acylate film including a cellulose acylate having substitution degrees satisfying formulae (9) to (11):

$$2.0 \leq X+Y \leq 3.0 \quad (9)$$

$$0 \leq X \leq 2.0 \quad (10)$$

$$0 \leq Y \leq 1.5 \quad (11)$$

In the formulae, X represents a degree of an acetyl group substituting for 2, 3 or 6 position of cellulose, and Y represents a total degree of acyl groups substituting for 2, 3 and 6 positions of cellulose, in which the acyl groups are selected from the group consisting of a propionyl group, a butyryl group, a pentanoyl group and a hexanoyl group.

(Retardation Raising Agent)

In order to satisfy formulae (1) to (6), a retardation raising agent represented by the following formula (I) may be contained. In the case where the retardation raising agent shown below is added to a polymer material and the polymer is subjected to a stretching treatment, the molecular long axis in the retardation raising agent is oriented in the stretching direction. In the retardation raising agent, the molecular absorption wavelength derived from the electric dipole transition moment in a direction nearly orthogonal to the molecular long axis direction is longer than the molecular absorption wavelength derived from the electric dipole transition moment in a direction nearly parallel to the molecular long axis direction.

Formula (I):

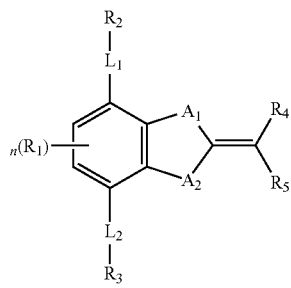

In formula (1), $L_1$ and $L_2$ each represents a single bond or a divalent linking group, $A_1$ and $A_2$ each independently represents a group selected from the group consisting of —O—, —NR— (wherein R is a hydrogen atom or a substituent), —S— and —CO—, $R_1$, $R_2$, $R_3$, $R_4$ and $R_5$ each represents a substituent, and n represents an integer of 0 to 2.

R1 is a substituent and when there are two or more R1's, they may be the same or different, or may form a ring. Specific examples of the substituent include a halogen atom (e.g., a fluorine atom, a chlorine atom, a bromine atom, an iodine atom), an alkyl group (preferably an alkyl group having 1 to 30 carbon atoms, e.g., a methyl group, an ethyl group, a n-propyl group, an isopropyl group, a to butyl group, a n-octyl group, a 2-ethylhexyl group), a cycloalkyl group (preferably a substituted or unsubstituted cycloalkyl group having 3 to 30 carbon atoms, e.g., a cyclohexyl group, a cyclopentyl group, a 4-n-dodecylcyclohexyl group), a bicycloalkyl group (preferably a substituted or unsubstituted bicycloalkyl group having 5 to 30 carbon atoms, that is, a monovalent group obtained by removing one hydrogen atom from a bicycloalkane having 5 to 30 carbon atoms, e.g., a bicyclo[1,2,2]heptane-2-yl group, a bicyclo[2,2,2]octane-3-yl group), an alkenyl group (preferably a substituted or unsubstituted alkenyl group having 2 to 30 carbon atoms, e.g., a vinyl group, an allyl group), a cycloalkenyl group (preferably a substituted or unsubstituted cycloalkenyl group having 3 to 30 carbon atoms, that is, a monovalent group obtained by removing one hydrogen atom from a cycloalkene having 3 to 30 carbon atoms, e.g., a 2-cyclopentene-1-yl group, a 2-cyclohexene-1-yl group), a bicycloalkenyl group (a substituted or unsubstituted bicycloalkenyl group, preferably a substituted or unsubstituted bicycloalkenyl group having 5 to 30 carbon atoms, that is, a monovalent group obtained by removing one hydrogen atom from a bicycloalkene having one double bond, e.g., a bicyclo[2,2,1]hepto~2-ene-1-yl group, a bicyclo[2,2,2]octo-2-ene-4-yl group), an alkynyl group (preferably a substituted or unsubstituted alkynyl group having 2 to 30 carbon atoms, e.g., an ethynyl group, a propargyl group), an aryl group (preferably a substituted or unsubstituted aryl group having 6 to 30 carbon atoms, e.g., a phenyl group, a p-tolyl group, a naphthyl group), a heterocyclic group (preferably a 5- or 6-membered substituted or unsubstituted heterocyclic group, that is a monovalent group obtained by removing one hydrogen atom from an aromatic or non-aromatic heterocyclic compound, more preferably a 5- or 6-membered aromatic heterocyclic group having 3 to 30 carbon atoms, e.g., a 2-furly group, a 2-thienyl group, a 2-pyrimidinyl group, a 2-benzothiazolyl group), a cyano group, a hydroxyl group, a nitro group, a carboxyl group, an alkoxy group (preferably a substituted or unsubstituted alkoxy group having 1 to 30 carbon atoms, e,g., a methoxy group, an ethoxy group, an isopropoxy group, a t-butoxy group, a n-octyloxy group, a 2-methoxy-ethoxy group), an aryloxy group (preferably a substituted or unsubstituted aryloxy group having 6 to 30 carbon atoms, e.g., a phenoxy group, a 2-methylphenoxy group, a 4-tert-butylphenoxy group, a 3-nitrophenoxy group, a 2-tetradecanoylaminophenoxy group), a silyloxy group (preferably a silyloxy group having 3 to 20 carbon atoms, e.g., a trimethylsilyloxy group, a tert-butyldimethylsilyloxy group), a heterocyclic oxy group (preferably a substituted or unsubstituted heterocyclic oxy group having 2 to 30 carbon atoms, e.g., a 1-phenyltetrazole-5-oxy group, a 2-tetrahydropyranyloxy group), an acyloxy group (preferably a formyloxy group, a substituted or unsubstituted alkylcarbonyloxy group having 2 to 30 carbon atoms, and a substituted or unsubstituted arylcarbonyloxy group having 6 to 30 carbon atoms, e.g., a formyloxy group, an acetyloxy group, a pivaloyloxy group, a stealoyloxy group, a benzoyloxy group, a p-methoxyphenylcarbonyloxy group), a carbamoyloxy group (preferably a substituted or unsubstituted carbamoyloxy group having 1 to 30 carbon atoms, e.g., an N,N-dimethylcarbamoyloxy group, an N,N-diethylcarbamoyloxy group, a morpholinocarbonyloxy group, an N,N-di-n-octylaminocarbonyloxy group, an N-n-octylcarbamoyloxy group), an alkoxycarbonyloxy group (preferably a substituted or unsubstituted alkoxycarbonyloxy group having 2 to 30 carbon atoms, e.g., a metlhoxycarbonyloxy group, an ethoxycarbonyloxy group, a tert-butoxycarbonyloxy group, a n-octylcarbonyloxy group), an aryloxycarbonyloxy group (preferably a substituted or unsubstituted aryloxycarbonyloxy group having 7 to 30 carbon atoms, e.g., a phenoxycarbonyloxy group, a p-methoxyphenoxycarbonyloxy group, a p-n-hexadecyloxyphenoxycarbonyloxy group), an amino group (preferably an amino group, a substituted or unsubstituted alkylamino group having 1 to 30 carbon atoms, and a substituted or unsubstituted anilino group having 6 to 30 carbon atoms, e.g., an amino group, a methylamino group, a dimethylamino group, an anilino group, an N-methyl-anilino group, a diphenylamino group), an acylamino group (preferably a formylamino group, a substituted or unsubstituted alkylcarbonylamino group having 1 to 30 carbon atoms, and a substituted or unsubstituted arylcarbonylamino group having 6 to 30 carbon atoms, e.g., a formylamino group, an acetylamino group, a pivaloylamino group, a lauroylamino group, a benzoylamino group), an amiocarbonylamino group (preferably a substituted or unsubstituted aminocarbonylamino group having 1 to 30 carbon atoms, e.g., a carbamoylamino group, an N,N-dimethylaminocarbonylamino group, an N,N-diethylaminocarbonylamino group, a morpholinocarbonylamino group), an alkoxycarbonylamino group (preferably a substituted or unsubstituted alkoxycarbonylamino group having 2 to 30 carbon atoms, e.g., a methoxycarbonylamino group, an ethoxycarbonylamino group, a tert-butoxycarbonylamino group, a n-octadecyloxycarbonylamino group, an N-methyl-methoxycarbonylamino group), an aryloxycarbonylamino group (preferably a substituted or unsubstituted aryloxycarbonylamino group having 7 to 30 carbon atoms, e.g., a phenoxycarbonylamino group, a p-chlorophenoxycarbonylamino group, a m-n-octyloxyphenoxycarbonylamino group), a sulfamoyl amino group (preferably a substituted or unsubstituted sulfamoylamino group having 0 (zero) to 30 carbon atoms, e.g., a sulfamoylamino group, an N,N-dimethylaminocarbonylamino group, an N-n-octlaminosulfonylamino group), an alkyl- or aryl-sulfonylamino group (preferably a substituted or unsubstituted alkylsulfonylamino group having 1 to 30 carbon atoms, a substituted or unsubstituted arylsulfonylamino group having 6 to 30 carbon atoms, e.g., a methylsulfonylamino group, a butylsulfonylamino group, a phenylsulfonylamino group, a 2,3,5-trichlorophenylsulfonylamino group, a p-methylphenylsulfonylamino group), a mercapto group, an alkylthio group (preferably a substituted or unsubstituted alkylthio group having 1 to 30 carbon atoms, e.g., a methylthio group, an ethylthio group, a n-hexadecylthio group), an arylthio group (preferably a substituted or unsubstituted arylthio group having 6 to 30 carbon atoms, e.g., a phenylthio group, a p-chlorophenylthio group, a m-methoxyphenylthio group), a heterocyclic thio group (preferably a substituted or unsubstituted heterocyclic thio group having 2 to 30 carbon atoms, e.g., a 2-benzothiazolylthio group, a 1-phenyltetrazol-5-yl thio group), a sulfamoyl group (preferably a substituted or unsubstituted sulfamoyl group having 0 (zero) to 30 carbon atoms, e.g., an N-ethylsulfamoyl group, an N-(3-dodecyloxypropyl)sulfamoyl group, an N,N-diethylsulfamoyl group, an N-acetylsulfamoyl group, an N-benzoylsulfamoyl group, an N-(N'-phenylcarbamoyl)sulfamoyl group), a sulfo group, an alkyl- or aryl-sulfinyl group (preferably a substituted or unsubstituted alkylsulfinyl group having 1 to 30 carbon atoms, or a substituted or unsubstituted arylsulfinyl group having 6 to 30 carbon atoms, e.g., a methylsulfinyl group, an ethylsulfinyl group, a phenylsulfinyl group, a p-methylphenylsulfinyl group), an allyl- or aryl-sulfonyl group (preferably a substituted or unsubstituted alkylsulfonyl group having 1 to 30 carbon atoms, or a substituted or unsubstituted arylsulfonyl group having 6 to 30 carbon atoms, e.g., a methylsulfonyl group, an ethylsulfonyl group, a phenylsulfonyl group, a p-methylphenylsulfonyl group), an acyl group preferably a formyl group, a substituted or unsubstituted alkylcarbonyl group having 2 to 30 carbon atoms, or a substituted or unsubstituted arylcarbonyl group having 7 to 30 carbon atoms, e.g., an acetyl group, a pivaloylbenzoyl group), an aryloxycarbonyl group (preferably a substituted or unsubstituted aryloxycarbonyl group having 7 to 30 carbon atoms, e.g., a phenoxycarbonyl group, an o-chlorophenoxycaxbonyl group, a m-nitrophenoxycarbonyl group, a p-tert-butylphenoxycarbonyl group), an alkoxycarbonyl group (preferably a substituted or unsubstituted alkoxycarbonyl group having 2 to 30 carbon atoms, e.g., a methoxycarbonyl group, an ethoxycarbonyl group, a tert-butoxycarbonyl group, a n-octadecyloxycarbonyl group), a carbamoyl group (preferably a substituted or unsubstituted carbamoyl group having 1 to 30 carbon atoms, e.g., a carbamoyl group, an N-methylcarbamoyl) group, an N,N-dimethylcarbamoyl group, an N,N-di-n-octylcarbamoyl group, an N-(methylsulfonyl)carbamoyl group), an aryl- or heterocyclic-azo group (preferably a substituted or unsubstituted arylazo group having 6 to 30 carbon atoms or a substituted or unsubstituted heterocyclic azo group having 3 to 30 carbon atoms, e.g., a phenylazo group, a p-chlorophenylazo group, a 5-ethylthio-1,3,4-thiadiazole-2-yl azo group), an imido group (preferably an N-succinimido group, an N-phthalimido group), a phosphino group (preferably a substituted or unsubstituted phosphino group having 2 to 30 carbon atoms, e.g., a dimethylphosphino group, a diphenylphosphino group, a methylphenoxyphosphino group), a phosphinyl group (preferably a substituted or unsubstituted phosphinyl group having 2 to 30 carbon atoms, e,g., a phosphinyl group, a dioctyloxyphosphinyl group, a diethoxyphosphinyl group), a phosphinyloxy group (preferably a substituted or unsubstituted phosphinyloxy group having 2 to 30 carbon atoms, e.g., a diphenoxyphosphinyloxy group, a dioctyloxyphosphinyloxy group), a phosphinylamino group (preferably a substituted or unsubstituted phosphinylamino group having 2 to 30 carbon atoms, e.g., a dimethoxyphosphinylamino group, a dimethylaminophosphinylamino group), and a silyl group (preferably a substituted or unsubstituted silyl group having 3 to 30 carbon atoms, e,g., a trimethylsilyl group, a tert-butyldimethylsilyl group, a phenyldimethylsilyl group).

Of the above-mentioned substituents, those substituents which have hydrogen atom(s) may be further substituted with the above groups in place of the hydrogen atom(s). Examples of such functional groups include an alkylcarbonylaminosulfonyl group, an arylcarbonylaminosulfonyl group, an alkylsulfonylaminocarbonyl group, and an arylsulfonylaminocarbonyl group. Examples thereof include methylsulfonylaminocarbonyl, p-methylphenylsulfonylaminocarbonyl, acetylaminosulfonyl, and benzoylaminosulfonyl.

$R_1$ is preferably a halogen atom, an alkyl group, an alkenyl group, an aryl group, a heterocyclic group, a hydroxyl group, a carboxyl group, an alkoxy group, an aryloxy group, an acyloxy group, a cyano group or amino group; and, more preferably a halogen atom, an alkyl group, a cyano group or an alkoxy group.

$R_2$ and $R_3$ each independently represent a substituent. Examples thereof include those of $R_1$ described above. For obtaining the effects of the present invention, the low-molecular weight compound for use in the present invention used for an optical film is preferably oriented with a higher degree of ordered orientation. When the low-molecular weight compound for use in the present invention is the compound represented by formula (I), $R_2$ and $R_3$ exert larger influences on the order of orientation. For raising the degree of ordered orientation, the compound represented by formula (I) preferably shows liquid crystallinity. Further, from a view point of raising the degree of ordered orientation, preferably, $R_2$ and $R_3$ each independently represent a substituted or unsubstituted benzene ring or a substituted or unsubstituted cyclohexane ring. $R_2$ and $R_3$ each more preferably represent a benzene ring having a substituent or a cyclohexane ring having a substituent, further preferably a benzene ring having a substituent at the 4-position or a cyclohexane ring having a substituent at the 4-position, still more preferably a benzene ring having a substituted or unsubstituted benzoyloxy group at the 4-position, a benzene ring having a substituted or unsubstituted cyclohexyl group at the 4position, a cyclohexane ring having a substituted or unsubstituted benzene ring at the 4-position, or a cyclohexane ring having a substituted or unsubstituted cyclohexane at the 4position. Among them, preferable is a cyclohexane ring having a substituted or unsubstituted cyclohexyl group at the 4-position. Further, more preferable is a benzene ring having, at the 4-position, a benzoyloxy group having a substituent at the 4-position; a benzene ring having, at the 4-position, a cyclohexyl group having a substituent at the 4-position; a cyclohexane ring having, at the 4-position, a benzene ring having a substituent at the 4-position; or a cyclohexane group having, at the 4-position, a cyclohexyl group having a substituent at the 4-position. Most preferable is a cyclohexane ring having, at the 4-position, a cyclohexyl group having a substituent at the 4-position. The substituent of the cyclohexyl group having a substituent at the 4-position is preferably, but not particularly limited to, an alkyl group.

In addition, even though there are stereoisomeric forms, cis- and trans-forms, for the cyclohexane ring having a substituent at the 4-position, the present invention is not limited to any of them and a mixture of them may be also available. However, the trans-cyclohexane ring is preferable.

$R_4$ and $R_5$ each independently represent a substituent. Examples thereof include those of $R_1$ described above. The substituent is preferably an electron-withdrawing substituent having a Hammett substituent constant $\sigma_p$ value of more than zero (0), and it more preferably has an electron-withdrawing substituent having an $\sigma_p$ value of 0 to 1.5. Examples of such a substituent include a trifluoromethyl group, a cyano group, a carbonyl group and a nitro group. $R_4$ and $R_5$ may be bonded together to form a ring.

Herein, Hammett's substituent constants $\sigma_p$ and $\sigma_m$ are described in detail in such books as "Hammett Soku—Kozo to Hannousei—," written by Naoki Inamoto (Maruzen); "Shin-jikken Kagaku-koza 14/Yukikagoubutsu no Gosei to Hanno V," page 2605 (edited by Nihonkagakukai, Maruzen); "Riron Yukikagaku Kaisetsiu" written by Tadao Nakaya, page 217 (Tokyo Kagakudojin); and "Chemical Review" (Vol. 91), pages 165 to 195 (1991).

Preferred examples of $L_1$ and $L_2$ are set forth below.

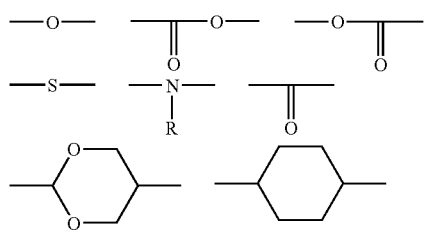

R represents a hydrogen atom or a substituent.

In order to satisfy formulae (1) to (4), (7), and (8) a retardation raising agent may be contained, may be selected from the compounds represented by the following formulae (II), (III) and (IV). When the retardation raising agent shown below is added to a polymer material and the polymer is subjected to a stretching treatment, the molecular long axis in the retardation raising agent is oriented in the stretching direction. In the retardation raising agent, the molecular absorption wavelength derived from the electric dipole transition moment in a direction nearly parallel to the molecular long axis direction is longer than the molecular absorption wavelength derived from the electric dipole transition moment in a direction nearly orthogonal to the molecular long axis direction.

Formula (II):

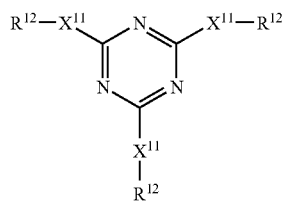

In formula (II), $R^{12}$'s each independently represents an aromatic ring or hetero ring having a substituent at least at the ortho-position, the meta-position or the para-position.

$X^{11}$'s each independently represents a single bond or —$NR^{13}$—, wherein $R^{13}$'s each independently represents a hydrogen atom, a substituted or unsubstituted alkyl group, an alkenyl group, an aryl group or a heterocyclic group.

The compound represented by formula (III) is described below. Formula (III):

$$Q^{71}\text{-}Q^{72}\text{-}OH$$

wherein $Q^{71}$ represents a nitrogen-containing aromatic hetero ring, and $Q^{72}$ represents an aromatic ring.

In formula (III), $Q^{71}$ represents a nitrogen-containing aromatic hetero ring and is preferably a 5- to 7-membered nitrogen-containing aromatic hetero ring, more preferably a 5- or 6-membered nitrogen-containing aromatic hetero ring.

The compound represented by formula (IV) is described below.

Formula (IV):

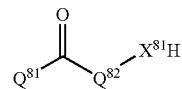

In formula (IV), $Q^{81}$ and $Q^{82}$ each independently represents an aromatic ring, and $X^{81}$ represents $NR^{81}$ (wherein $R^{81}$ represents a hydrogen atom or a substituent), an oxygen atom or a sulfur atom.

The aromatic hydrocarbon ring represented by $Q^{81}$ and $Q^{82}$ is preferably a monocyclic or bicyclic hydrocarbon ring having a carbon number of 6 to 30 (e.g., benzene ring, naphthalene ring), more preferably an aromatic hydrocarbon ring having a carbon number of 6 to 20, still more preferably an aromatic hydrocarbon ring having a carbon number of 6 to 12, yet still more preferably a benzene ring.

(Cycloolefin Polymer)

In the present invention, an optical compensation sheet containing a cycloolefin polymer may be used. The cycloolefin polymer differs in the polymer structure from the cellulose acylate and is an effective material when the phase difference in the thickness direction is intended to be intensified.

The cycloolefin polymer film preferably used in the present invention is described below.

(Cycloolefin Polymer)

Hereinafter, the term "(co)polymer" indicates a copolymer and/or a polymer.

Examples of the (co)polymer having a cycloolefin structure include (1) a norbornene polymer, (2) a polymer of a monocyclic cycloolefin, (3) a polymer of a cyclic conjugated diene, (4) a vinyl alicyclic hydrocarbon polymer, and hydrides of (1) to (4).

A polymer for use in the present invention as a cycloolefin polymer is preferably a cycloolefin polymer containing a (co)polymer of a cycloolefin monomer having at least one polar group selected from the group consisting of the following formula (1), more preferably a cycloolefin polymer containing an addition (co)polymer of a cycloolefin monomer having at least one polar group selected from the group consisting of the following formula (1).

Formula (1):

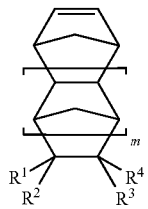

In formula (1), m represents an integer of 0 to 4, and at least one of $R^1$, $R^2$, $R^3$ and $R^4$ represents a polar group, with the remaining being a nonpolar group. The nonpolar group is a hydrogen atom; a halogen atom; a linear or branched alkyl, haloalkyl, alkenyl or haloalkenyl, having a carbon number of 1 to 20; a linear or branched alkynyl or haloalkenyl, having a carbon number of 3 to 12; a cycloalkyl having a carbon number of 3 to 12 and substituted or not substituted by alkyl, alkenyl, alkynyl, halogen atom, haloalkyl, haloalkenyl or haloalkynyl; an allyl having a carbon number of 6 to 40 and substituted or not substituted by alkyl, alkenyl, alkynyl, halogen atom, haloalkyl, haloalkenyl or haloalkynyl; or an aralkyl having a carbon number of 7 to 15 and substituted or not substituted by alkyl, alkenyl, alkynyl, halogen atom, haloalkyl, haloalkenyl or haloalkynyl. The polar group is a non-hydrocarbon polar group containing at least one or more oxygen atom, nitrogen atom, phosphorus atom, sulfur atom, silicon atom or boron atom and is selected from the group consisting of —$R^5OR^6$, —$OR^6$, —$OC(O)OR^6$, —$R^5OC(O)OR^6$, —$C(O)R^6$, —$R^5C(O)OR^6$, —$C(O)OR^6$, —$R^5C(O)R^6$, —$OC(O)R^6$, —$R^5OC(O)R^6$, —$(R^5O)_k$—$OR^6$, —$(OR^5)_k$—$OR^6$, —$C(O)$—$O$—$C(O)R^6$, —$R^5C(O)$—$O$—$C(O)R^6$, —$SR^6$, —$R^5SR^6$, —$SSR^6$, —$R^5SSR^6$, —$S(=O)R^6$, —$R^5S(=O)R^6$, —$R^5C(=S)R^6$, —$R^5C(=S)SR^6$, —$R^5SO_3R^6$, —$SO_3R^6$, —$R^5N=C=S$, —$NCO$, —$R^5$—$NCO$, —$CN$, —$R^5CN$, —$NNC(=S)R^6$, —$R^5NNC(=S)R^6$, —$NO_2$, —$R^5NO$,

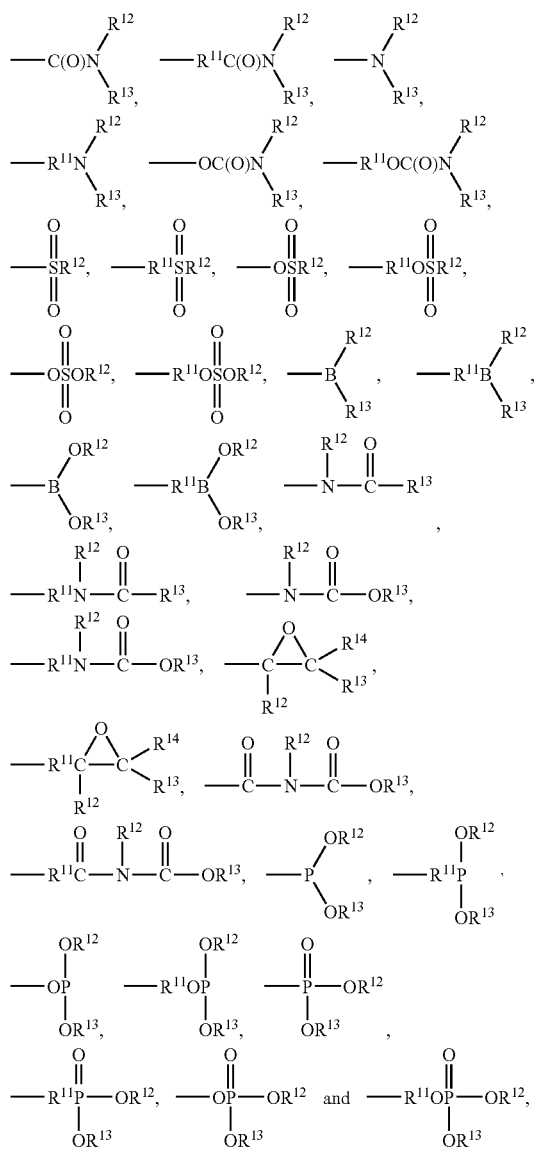

wherein $R^5$ and $R^{11}$ each represents a linear or branched alkylene, haloalkylene, alkenylene or haloalkenylene, having a carbon number of 1 to 20; a linear or branched alkynylene or haloalkenylene, having a carbon number of 3 to 20; a cycloalkylene having a carbon number of 3 to 12 and substituted or not substituted by alkyl, alkenyl, alkynyl, halogen atom, haloalkyl, haloalkenyl or haloalkynyl; an arylene having a carbon number of 6 to 40 and substituted or not substituted by alkyl, alkenyl, alkynyl, halogen atom, haloalkyl, haloalkenyl or haloalkynyl; or an aralkylene having a carbon number of 7 to 15 and substituted or not substituted by alkyl, alkenyl, alkynyl, halogen atom, haloalkyl, haloalkenyl or haloalkynyl, $R^6$, $R^{12}$, $R^{13}$ and $R^{14}$ each independently represents a hydrogen atom; a halogen atom; a linear or branched alkyl, haloalkyl, alkenyl or haloalkenyl, having a carbon number of 1 to 20; a linear or branched alkynyl or haloalkynyl, having a carbon number of 3 to 20; a cycloalkyl having a carbon number of 3 to 12 and substituted or not substituted by alkyl, alkenyl, alkynyl, halogen atom, haloalkyl, haloalkenyl or haloalkynyl; an allyl having a carbon number of 6 to 40 and substituted or not substituted by alkyl, alkenyl, alkynyl, halogen atom, haloalkyl, haloalkenyl or haloalkynyl; an aralkyl having a carbon number of 7 to 15 and substituted or not substituted by alkyl, alkenyl, alkynyl, halogen atom, haloalkyl, haloalkenyl or haloalkynyl, or an alkoxy, haloalkoxy, carbonyloxy or halocarbonyloxy. k represents an integer of 1 to 10.

A polymer used for the cycloolefin polymer of the present invention is preferably a norbornene (co)polymer.

Specific examples of the norbornene (co)polymer include a ring-opened polymer of a norbornene monomer, a ring-opened copolymer of a norbornene monomer and other monomers ring-opening copolymerizable with the norbornene monomer, hydrogenation products thereof, an addition polymer of a norbornene monomer, and an addition-type copolymer of a norbornene monomer and other monomers copolymerizable with the norbornene monomer. Among these, in view of transparency and moisture permeability, addition (co)polymers and ring-opened (co)polymer hydrogenation products of a norbornene monomer are most preferred.

The norbornene addition (co)polymer is disclosed, for example, in JP-A-10-7732, JP-T-2002-504184, U.S. Patent Application Publication No. 2004/229157 and International Publication No. 2004/070463, pamphlet. The norbornene addition (co)polymer is obtained by addition-polymerizing norbornene polycyclo-unsaturated compounds to each other. Also, if desired, a norbornene polycyclo-unsaturated compound may be addition-polymerized with an ethylene, propylene or butene; a conjugated diene such as butadiene and isoprene; a non-conjugated diene such as ethylene-norbornene; or a linear diene compound such as acrylonitrile, acrylic acid, methacrylic acid, maleic anhydride, acrylic acid ester, methacrylic acid ester, maleimide, vinyl acetate and vinyl chloride. This norbornene addition (co)polymer is sold under the trade name of APEL from Mitsui Chemicals, Inc. and there are available grades differing in the glass transition temperature (Tg), such as APL8008T (Tg: 70° C.), APL6013T (Tg: 125° C.) and APL6015T (Tg: 135° C.). Also, pellets such as TOPAS8007 (Tg: 80° C.), TOPAS6013 (Tg: 140° C.) and TOPAS6015 (Tg: 160° C.) are sold from Polyplastics Co., Ltd. Furthermore, Appear 3000 (Tg: 330° C.) is sold from Ferrania.

As disclosed, for example, in JP-A-1-240517, JP-A-7-196736, JP-A-60-26024, JP-A-62-19801, JP-A-2003-1159767 and JP-A-2004-309979, the norbornene ring-opened polymer hydride is prepared by addition-polymerizing or ring-opening metathesis polymerizing a polycyclo-unsaturated compound and then hydrogenating the polymer Such a norbornene polymer is sold under the trade names of Arton G and Arton F from JSR and is also commercially available under the trade names of Zeonor 750R, 1020R and 1600 and Zeonex 250 or 280 from ZEON Corp., and these resins may be used.

A transparent film used in the present invention is not limited to a film of single layer, and for example, may be manufactured by stacking layers in which polymer materials are coated. Polymer materials used in the present invention are not especially limited as long as they satisfy the characteristics as described above. Examples of the polymer materials include polyamide, polyimide, polyester, polyether ketone, polyamide imide and polyester imide. By using these materials, a film satisfying formulae (1) to (4), (7), and (8) can be obtained. As these polymers, one kind of polymer may be used, or two or more kinds of polymers may be used. When two or more kinds of polymers are used, they can be mixed or copolymerized and the ratio of them is not limited. Among the polymers, polyimide is preferred since rigidity, linearity, and symmetry of the main chain are excellent and birefringence in a large thickness direction can be achieved. As the polyimide, preferred is polyimide having a high in-plane orientation performance and capable of being solved in organic solvents, for example, polyimide disclosed in U.S. Pat. No. 5,071,997, U.S. Pat. No. 5,480,964, JP-T-8-511812, JP-T-10-508048, and JP-T-2000-511296

<Polarizing Plate>

A polarizing plate of the present invention includes a polarizer and a pair of protective films sandwiching the polarizer, and at least one of the protective films may be an optical compensation sheet as above-described.

The at least one of protective films in the polarizing plate is an optical compensation sheet satisfying formulae (1) and (2); and the polarizing plate further includes a scattering film on a side opposite to the optical compensation sheet across the polarizer, the scattering film satisfying formula (12).

$$40 \leq Re(550) \leq 130 \quad (1)$$

$$100 \leq Rth(550) \leq 200 \quad (2)$$

$$\text{Haze value} \geq 30\% \quad (b\ 12)$$

wherein $Re(\lambda)$ is an in-plane retardation value for light at a wavelength of $\lambda$ nm, $Rth(\lambda)$ is a retardation vale in a thickness direction for light at a wavelength of $\lambda$ nm, and the haze value indicates a haze value of the scattering film in a direction 30% inclined with respect to a normal direction of the scattering film. The haze value can be measured in a direction 30% inclined with respect to a normal direction of the scattering film by using a haze meter (MODEL 1001DP, manufactured by Nippon Denshoku Industries Co., Ltd.) in accordance with JIS-K-7105.

<Polarizer>

The polarizer includes an iodine-based polarizer, a dye-based polarizer using a dichroic dye, and a polyene-based polarizer, and any of these may be used in the present invention. The iodine-based polarizer and the dye-based polarizer are generally produced using a polyvinyl alcohol-based film.

<Protective Film>

As for a protective film which is stuck to one surface of the polarizer, a polymer film transparent to light, specifically, having a visible light transmittance of 80% or more, is preferably used. The protective film is preferably a cellulose acylate film or a polyolefin film containing a polyolefin. Among cellulose acylate films, a cellulose triacetate film is preferred. Also, among polyolefin films, a polynorbornene film containing a cyclic polyolefin is preferred.

The thickness of the protective film is preferably from 20 to 500 µm, more preferably from 50 to 200 µm.

<Scattering Film>

In the present invention, a scattering film is stacked on one of the protective films of the polarizing plate, whereby the viewing angle-dependent color tint change particularly between black and white is improved as compared with a case of not stacking the scattering film. More specifically, in a TN-mode liquid crystal display device, yellow-tinged characteristic tint is sometimes generated in between, but by stacking a scattering film, this yellow tint is eliminated.

(Light Scattering Layer)

A light scattering layer as one embodiment of the scattering film is a layer containing light-transparent resin and light-transparent fine particles having a refractive index different from the refractive index of the light-transparent resin. The scattered light profile and haze value are adjusted by the difference in refractive index between light-transparent particle and light-transparent resin, the particle diameter of light-transparent particle, and the content of light-transparent particle. In the present invention, it may be sufficient if one or more kinds of light-transparent particles are used, but two or more kinds of light-transparent fine particles differing in the particle diameter and/or the material are preferably used, because the scattered light profile and haze value can be adjusted.

The difference between the refractive index of the light-transparent fine particle and the refractive index of the light-transparent resin constituting the entire light scattering layer (in the case where an inorganic fine particle or the like for the adjustment of refractive index of the layer, which is described later, is added to the light-transparent resin, the average optical refractive index of the resin is used) is preferably from 0.03 to 0.30. If the difference in refractive index is less than 0.03, the light scattering effect can be hardly obtained due to a too small difference in refractive index therebetween, whereas if the difference in refractive index exceeds 0.30, excessively large light scattering occurs and the entire film is whitened. The difference in refractive index is more preferably from 0.06 to 0.25, and most preferably from 0.09 to 0.20.

In an exemplary embodiment of the present invention, in order to obtain appropriate scattering property and thereby improve the viewing angle characteristics, the particle diameter of the light-transparent fine particle (first light-transparent fine particle) is preferably from 0.5 to 3.5 µm, more preferably from 0.5 to 2.0 µm, and most preferably from 0,6 to 1.8 µm. As the scattering effect is larger, the viewing angle characteristics are enhanced, but considering the display grade, it is also necessary to increase the transmittance as much as possible for maintaining the front brightness. If the particle diameter is less than 0.5 µm, the scattering effect is large and the viewing angle characteristics are enhanced but large backward scattering occurs and the brightness greatly decreases, whereas if it exceeds 3.5 µm, the scattering effect is reduced and the viewing angle characteristics are less enhanced.

It is also preferred to further add a light-transparent fine particle not primarily intended to impart a scattering effect (second light-transparent fine particle). This light-transparent fine particle is used to create irregularities on the scattering film surface and bring about a function of preventing disturbing reflection. The particle diameter of the second light-transparent fine particle is preferably larger than the particle diameter of the first light-transparent particle, more preferably from 2.5 to 10.0 µm. With a particle diameter in this range, suitable surface scattering is allowed to occur. In order to achieve a good display grade, it is also necessary to prevent a reflection of outside light. As the surface haze value is lower, a light brownish look due to outside light is weakened and a clear display can be obtained on the display, but if the surface haze is too low, a disturbing reflection becomes large. Therefore, a low refractive index layer having a refractive index lower than the refractive index of the light scattering layer may also be preferably provided as an outermost layer to reduce the reflectance. In order to control the surface haze value, appropriate irregularities are preferably created on the resin layer surface by using the second light-transparent fine particle, but the present invention is not limited thereto. If the particle diameter is less than 2.5 µm, the thickness of the layer should be made small for creating desired irregularities on the surface and this is not preferred in view of film hardness, whereas if it exceeds 10 µm, individual particles come to have a large weight and this is not necessarily advantageous from the standpoint of precipitation stability of particles in a coating solution. Accordingly, the particle diameter of the second light-transparent fine particle is still more preferably from 2.7 to 9.0 µm and most preferably from 3.0 to 8.0 µm.

The difference of the refractive index of the second light-transparent particle from the refractive index of the light-transparent resin constituting the entire light scattering layer is preferably smaller than that of the refractive index of the first light-transparent particle.

As for the surface irregularities, the surface roughness Ra is preferably 0.5 µm or less, more preferably 0.3 µm or less, and most preferably 0.2 µm or less. The surface roughness Ra (centerline average roughness) can be measured in accordance with JIS-B0601.

The haze value of the light scattering layer, particularly, the internal scattering haze (internal haze) greatly contributing to scattering of transmitted light, is strongly correlated with the effect of improving the viewing angle characteristics. Light emitted from a backlight is scattered in a light scattering layer provided on the surface of a viewing-side polarizing plate, whereby the viewing angle characteristics are improved. However, if the light is excessively scattered, the front brightness decreases. Therefore, the internal haze of the light scattering layer is preferably from 40 to 90%, more preferably from 45 to 80%, still more preferably from 45 to 70%. The method for elevating the internal scattering haze includes, for example, increasing the coated amount of a light-scattering fine particle intended to impart light scattering property, decreasing the particle diameter when the coated amount is the same, and increasing the difference in refractive index between the particle and the resin.

In an exemplary embodiment of the present invention, in order to raise the display grade (improve viewing angle characteristics), it is particularly preferred that the scattered light intensity at 30° based on the light intensity at an output angle of 0° in a scattered light profile by a goniophotometer is set to a specific range. The scattered light intensity at 30° based on the light intensity at an output angle of 0° in a scattered light profile is preferably from 0.05 to 0.3%, more preferably from 0.05 to 0.2%, still more preferably from 0.05 to 0.15%. Within this range, the front brightness is less decreased and the required effect of improving the viewing angle characteristics can be obtained. The scattered light profile more preferably satisfies the above-described preferred range of internal haze at the same time.

From the standpoint of satisfying both the reduction of a disturbing reflection and the reduction of a light brownish look, the haze ascribable to surface scattering (surface haze) of the light scattering film of the present invention is preferably from 0.1 to 30% and is preferably 10% or less, more preferably 5% or less. In the case of attaching importance to the reduction of a light brownish look due to outside light, the surface haze is preferably 4% or less, more preferably 2% or less. When the surface haze is decreased, disturbing reflection becomes large. Therefore, the integrated reflectance at 5° incidence is preferably adjusted by providing a low refractive index layer such that the average value in the wavelength region from 450 nm to 650 nm becomes 3.0% or less, more preferably 2.0% or less, and most preferably 1.0% or less. In the present invention, with respect to elevation of the display grade (improvement of viewing angle characteristics), the above-described internal scattering property needs to be adjusted, but when the surface haze and/or reflectance are at the same time adjusted to suitable ranges, the contrast in a bright room is improved and a most preferred effect can be brought out.

The light-transparent fine particle may be either a monodisperse organic fine particle or a monodisperse inorganic fine particle. A smaller fluctuation of the particle diameter enables more reduction in the fluctuation of scattering property and more facilitation of the haze design. The light-transparent fine particle is suitably a plastic bead and, in particular, a plastic bead having high transparency and giving the above-described numerical value as the difference in refractive index from the light-transparent resin is preferred. Examples of the organic fine particle include a polymethyl methacrylate bead (refractive index: 1.49), an acyl-styrene copolymer bead (refractive index: from 1.52 to 1.57), a melamine bead (refractive index: from 1.57 to 1.65), a polycarbonate bead (refractive index: 1.57), a styrene bead (refractive index: 1.60), a crosslinked polystyrene bead (refractive index: 1.61), a polyvinyl chloride bead (refractive index, 1.60), and a benzoguanamine-melamine formaldehyde bead (refractive index: 1.68). Examples of the inorganic fine particle include a silica bead (refractive index: from 1.44 to 1.46) and an alumina bead (refractive index: 1.63). The light-transparent fine particle is suitably contained in an amount of 5 to 30 parts by mass per 100 parts by mass of the light-transparent resin.

In the case of the above-described light-transparent fine particle, the light-transparent fine particle is liable to precipitate in the resin composition (light-transparent resin) and therefore, an inorganic filler such as silica may be added for preventing the precipitation. As the amount of the inorganic filler added increases, this is more effective in preventing precipitation of the light-transparent fine particle but adversely affects the transparency of the coating film. Accordingly, an inorganic filler having a particle diameter of 0.5 µm or less is preferably contained in the light-transparent resin in an amount of less than about 0.1 mass % within the range not impairing the transparency of the coating film.

As for the light-transparent resin, resins which are cured by ultraviolet rays/electron beams are mainly used. More specifically, three kinds of resins, that is, an ionizing radiation-curable resin, a resin obtained by mixing a thermoplastic resin and a solvent with a ionizing radiation-curable resin, and a heat-curable resin, are used. In order to impart a hardcoat property, the main component is preferably an ionizing radiation-curable resin. The thickness of the light scattering layer is usually from 1.5 to 30 µm, preferably from 3 to 20 µm. In general, the light scattering layer usually functions also as a hardcoat layer, and if the thickness of the light scattering layer is less than 1.5 µm, the hardcoat property may be insufficient, whereas if it exceeds 30 µm, this may be disadvantageous in view of curling or brittleness. The refractive index of the light-transparent resin is, in the case of providing a low refractive index layer, preferably from 1.46 to 2.00, more preferably from 1.48 to 1.90, still more preferably from 1.50 to 1.80. Here, the refractive index of the light-transparent resin is an average value measured in a state of the light scattering layer not containing a light-transparent fine particle. If the refractive index of the light scattering layer is too small, the antireflection property decreases, whereas if it is excessively large, the color tint of reflected light becomes strong and this is not preferred. For these reasons, the refractive index is preferably in the above-described range. The refractive index of the light scattering layer can be set to a desired value in consideration of antireflection property and color tint of reflected light.

The binder used for the light-transparent resin is preferably a polymer having a saturated hydrocarbon or a polyether as the main chain, more preferably a polymer having a saturated hydrocarbon as the main chain. Also, the binder is preferably crosslinked. The polymer having a saturated hydrocarbon as the main chain is preferably obtained by a polymerization reaction of an ethylenically unsaturated monomer. In order to obtain a crosslinked binder, a monomer having two or more ethylenically unsaturated groups in the molecule is preferably used.

Examples of the monomer having two or more ethylenically unsaturated groups include an ester of polyhydric alcohol and (meth)acrylic acid (e.g., ethylene glycol di(meth)acrylate, 1,4dichlohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,3,5-cyclohexanetriol trimethacrylate, polyurethane polyacrylate, polyester polyacrylate), a vinyl benzene derivative (e.g., 1,4-divinylbenzene, 4-vinylbenzoic acid-2-acryloylethyl ester, 1,4-divinylcyclohexanone), a vinylsulfone (e.g., divinylsulfone), an acrylamide (e.g., methylenebisacrylamide), and a methacrylamide. Among these, an acrylate or methacrylate monomer having at least three functional groups is preferred, and an acrylate monomer having at least five functional groups is more preferred in view of film hardness, that is, scratch resistance. A mixture of dipentaerythritol pentaacrylate and dipentaerythritol hexaacrylate is commercially available and is particularly preferred.

The monomer having an ethylenically unsaturated group is dissolved in a solvent together with a polymerization initiator of various types and other additives, and the obtained solution is coated, dried and then subjected to a polymerization reaction under the effect of ionizing radiation or heat, whereby the coating can be cured.

In place of or in addition to the polymerization of a monomer having two or more ethylenically unsaturated groups, a crosslinked structure may be introduced into the binder by the reaction of a crosslinking group. Examples of the crosslinking functional group include an isocyanate group, an epoxy group, an aziridine group, an oxazoline group, an aldehyde group, a carbonyl group, a hydrazine group, a carboxyl group, a methylol group and an active methylene group. Also, a vinylsulfonic acid, an acid anhydride, a cyanoacrylate derivatives melamine, an etherified methylol, an ester, or a metal alkoxide such as urethane and tetramethoxysilane may be used as a monomer for introducing a crosslinked structure. A functional group which exhibits the crosslinking property as a result of the decomposition reaction, such as blocked isocyanate group, may also be used. That is, the crosslinking functional group for use in the present invention is not limited to a functional group which directly causes a reaction but may be a group which exhibits reactivity after the decomposition.

The binder having such a crosslinking functional group is coated and then heated, whereby a crosslinked structure can be formed.

The light-transparent resin is preferably formed from, in addition to the above-described binder polymer, a monomer having a high refractive index and/or a metal oxide ultrafine particle having a high refractive index. Examples of the monomer having a high refractive index include bis(4-methacryloylthiophenyl) sulfide, vinylnaphthalene, vinylphenyl sulfide and 4-methacryloxyphenyl-4'-methoxyphenyl thioether. As for the metal oxide ultrafine particle having a high refractive index, it is preferred to contain a fine particle having a particle diameter of 100 nm or less, preferably 50 nm or less, and comprising an oxide of at least one metal selected from the group consisting of zirconium, titanium, aluminum, indium, zinc, tin and antimony. The metal oxide ultrafine particle having a high refractive index is preferably an oxide ultrafine particle of at least one metal selected from the group consisting of Al, Zr, Zn, Ti, In and Sn, and specific examples thereof include $ZrO_2$, $TiO_2$, $Al_2O_3$, $In_2O_3$, $ZnO$, $SnO_2$, $Sb_2O_3$ and ITO. Among these, $ZrO_2$ is more preferred. The amount added of the monomer or metal oxide ultrafine particle having a high refractive index is preferably from 10 to 90 mass %, more preferably from 20 to 80 mass %, based on the total mass of the light-transparent resin.

As for the method of curing the ionizing radiation-curable resin composition, a normal curing method for the ionizing radiation-curable resin composition, that is, curing by irradiation with electron beam or ultraviolet ray, may be used.

(Photoinitiator)

Examples of the photoradical polymerization initiator include acetophenones, benzoins, benzophenones, phosphine oxides, ketals, anthraquinones, thioxanthones, azo compounds, peroxides (see, for example, JP-A-2001-139663), 2,3-dialkyldione compounds, disulfide compounds, fluoroamine compounds, aromatic sulfoniums, lophine dimers, onium salts, borate salts, active esters, active halogens, inorganic complexes and coumarins.

These initiators may be used individually or as a mixture.

Various examples are also described in *Saishin UV Koka Gijutsu* (*Newest UV Curing Technologies*), page 159, Technical Information Institute Co., Ltd. (1991), and Kiyomi Kato, *Shigaisen Koka System* (*Ultraviolet Curing System*), pp. 65-148, Sogo Gijutsu Center (1989), and these are useful in the present invention.

Preferred examples of the commercially available photoradical polymerization initiator include KAYACURE (e.g., DETX-S, BP-100, BDMK, CTX, BMS, 2-EAQ, ABQ, CPTX, EPD, ITX, QTX, BTC, MCA) produced by Nippon Kayaku Co., Ltd.; Irgacure (e.g., 127, 184, 500, 651, 819, 907, 369, 1173, 1870, 2959, 4265, 4263) produced by Ciba Specialty Chemicals Corp.; Esacure (KTP100F, KB1, EB3, BP, X33, KT046, KT37, ICP150, TZT) produced by Sartomer Company Inc.; and a mixture thereof.

The photopolymerization initiator is preferably used in an amount of 0.1 to 15 parts by mass, more preferably from 1 to 10 parts by mass, per 100 parts by mass of the polyfunctional monomer.

(Low Refractive Index Layer)

In the present invention, the object of the present invention may be attained by providing at least one light scattering layer in the above-described range, but when a layer having a refractive index lower than that of its adjacent layer is provided as the outermost layer to an appropriate thickness, this enables obtaining an antireflection performance, reducing the disturbing reflection of outside light, and increasing the contrast in a bright-room environment, which are more advantageous as an image display device.

The materials for forming the low refractive index layer are described below.

The low refractive index layer for use in the present invention is a layer formed by coating and curing a curable composition comprising a fluorine-containing compound as the main component or a curable composition containing a monomer having a plurality of bonding groups in the molecule and a low refractive index particle, where the refractive index is adjusted to a range of 1.20 to 1.50, preferably from 1.25 to 1.45, more preferably from 1.30 to 1.40.

Examples of the preferred embodiment of the curable composition include (1) a composition containing a fluorine-containing polymer having a crosslinking or polymerizable functional group, (2) a composition mainly comprising a hydrolysis condensate of a fluorine-containing organosilane material, and (3) a composition containing a monomer having two or more ethylenically unsaturated groups and an inorganic fine particle having a hollow structure.

(Transparent Substrate)

The light scattering layer for use in the present invention is preferably coated on a transparent substrates The material of the transparent substrate includes a transparent resin film, a transparent resin plate, a transparent resin sheet and a transparent glass. Examples of the transparent resin film include a cellulose ester (such as triacetyl cellulose and diacetyl cellulose, typified by TAC-TD80U and TD80UF produced by Fujifilm Corporation), a polyamide, a polyimide, a polycarbonate, a polyester (such as polyethylene terephthalate and polyethylene naphthalate), a polystyrene, a polyolefin, a norbornene-based resin (e.g., ARTON, trade name, produced by JSR Corp.), and an amorphous polyolefin (e.g., ZEONEX, trade name, produced by Zeon Corp.). Among these, a triacetyl cellulose, a polyethylene terephthalate and a polyethylene naphthalate are preferred, and a triacetyl cellulose is more preferred. The thickness of the support is, in view of handling (transportation suitability) and response to needs for thinning, suitably from 20 to 200 μm, preferably from 30 to 100 μm, more preferably from 35 to 90 μm, and most preferably from 40 to 80 μm.

<Scattering Film (Anisotropic Scattering Film)>

Other embodiments of the scattering film are described in detail below.

Other embodiments of the scattering film include an anisotropic scattering film (anisotropic light scattering film).

The anisotropic scattering film used for the formation of an optical compensation polarizing plate is a film giving different scattering angles depending on the azimuthal angle and by the use of this film, black rise at the oblique observation can be reduced and the contrast can be enhanced, as a result, the angle of not allowing for occurrence of tone reversal in a direction liable to bring about insufficient compensation, such as in the downward direction, can be enlarged. Also, color tint ascribable to a birefringent layer can be reduced. The anisotropic scattering film may be obtained, for example, as Lumisty (trade name, produced by Sumitomo Chemical Co., Ltd.) or a specklegram comprising a film having recorded therein speckles or may be obtained as a film comprising a light-transparent resin containing dispersed microregions differing in the birefringent characteristics.

Representative embodiments of the anisotropic scattering film are described below. In particular, the first embodiment is preferred.

(First Embodiment)

The anisotropic scattering film is preferably has a structure where portions differing in the refractive index are distributed inside of the film in an irregular manner in terms of shape and thickness, thereby forming a shading pattern comprising different levels of refractive index, and at the same time, the portions differing in the refractive index are distributed like layers each inclined with respect to the thickness direction of the film. This anisotropic light scattering film scatters light with such incident angle selectivity as causing light scattering for the light incident at an angle along the above-described inclination direction and functioning as a mere transparent film for the light incident at an angle perpendicular to the inclination direction. The direction in which the portions differing in the refractive index are inclined like layers preferably has a uniform refractive index distribution. Also, the direction in which the portions differing in the refractive index are inclined like layers preferably has an irregular refractive index distribution. Furthermore, it is preferred that the portions differing in the refractive index are irregular in the size and each has a vertically long (or horizontally long) shape and the light scattering from each portion becomes horizontally long (or vertically long) to thereby impart anisotropy to the light scattering property. Such an anisotropic light scattering film is disclosed in JP-A-2000-171691.

As described above, the light incident on the anisotropic light scattering film is transmitted as scattered light depending on the incident angle. The figure is a conceptual view showing the state of incident light (r1) on the anisotropic light scattering film (2) being transmitted as scattered light. The transmitted light (r2) exhibits the maximum scattering direction (a) of scattered light. θ is the maximum scattering angle made between the transmitted light (r2) exhibiting the maximum scattering direction and the normal direction (axis Z) of the anisotropic light scattering film (2). The maximum scattering angle is preferably in a range of 20 to 50°.

The material for the anisotropic light scattering film may be appropriately selected within a refractive index difference range of 0.001 to 0.2 to satisfy the above-described conditions, and the thickness of the film may also be appropriately selected in a range of 1,000 to 1 μm according to the refractive index difference. The size of the portions differing in the refractive index is random so as to cause light scattering and has no regularity, but the average size is appropriately selected from a range of 0.1 to 300 μm in terms of diameter.

The anisotropic light scattering film can be produced, for example, by utilizing a random mask pattern. That is, the ultraviolet light output from a UV light source is converted into parallel rays through a collimator optical system and irradiated on a mask original plate. The mask original plate comprises a glass substrate and a chrome pattern which is a random pattern. A photosensitive material is disposed in close contact with the surface opposite the UV irradiation side of the mask original plate, and the pattern of the mask original plate is exposed and irradiated on the photosensitive material. At this time, the UV parallel rays and the mask original plate are disposed to give an inclination at a predetermined angle α and therefore, the pattern is exposed in the photosensitive material with inclination of a predetermined angle. this angle corresponds to the inclination angle of the portions differing in the refractive index in the light scattering film (that is, the maximum scattering angle θ of incident angle dependency). The photosensitive material is a photosensitive material capable of recording the pattern as a change in the refractive index in the UV light exposed area and unexposed area, and this material has a resolving power higher than the shading pattern intended to record and can record the pattern also in its thickness direction. As for such a recording material, a volume-type hologram photosensitive material can be used, and examples thereof include a hologram silver-salt photosensitive material 8E56 Dry Plate produced by AGFA, a hologram photosensitive material HRF film or bichromated gelatin produced by DuPont, and DMP-128 Recording Material produced by Polaroid. Also, as for the mask original plate having a random pattern, black-and-white pattern data obtained by a random number calculation using a computer are etched as a metal chrome pattern on a glass substrate by means of so-called photolithography, and the obtained mask can be used. Of course, the preparation method of the mask original plate is not limited to this method, and a mask can be similarly produced also by a photographic process using a dry lithographic plate.

Furthermore, the anisotropic light scattering film can be produced by utilizing a speckle pattern. That is, ground glass is irradiated with laser light output from a laser light source. A photosensitive material is disposed at a predetermined distance on the surface opposite the laser irradiation side of the ground glass, and a speckle pattern which is a complex interference pattern created by laser light transmitted and scattered through the ground glass is exposed and irradiated on the photosensitive material. At this time, the ground glass and the photosensitive material are disposed to give an inclination at a predetermined angle α and therefore, the speckle pattern is exposed with inclination of a predetermined angle. This angle corresponds to the inclination of the portions differing in the refractive index in the light scattering film (that is, the maximum scattering angle θ of incident angle dependency). As for the laser light source used for the recording, an argon ion laser emitting light at a wavelength of 514.5 nm, 488 nm or 457.9 nm may be appropriately selected according to the sensitivity of the photosensitive material. Other than an argon ion laser, a laser light source having good coherence, such as helium neon laser or krypton ion laser, can also be used.

(Second Embodiment)

In the present invention, the scattering anisotropic film may also be produced, for example, by mixing one species or two or more species of a light-transparent resin and one species or two or more species of an appropriate material for forming microregions, which has excellent transparency and differs in the birefringent properties from the light-transparent resin, such as polymers or liquid crystals; forming a film where the material in a state of microregions is dispersed and contained in the light-transparent resin; and applying, if desired, an appropriate orientation treatment such as stretching to form regions differing in the birefringence.

The light-transparent resin is not particularly limited and an appropriate resin having transparency may be used. Examples thereof include a polyester-based resin, a styrene-based resin such as polystyrene and acrylonitrile-styrene copolymer (AS polymers), an olefin-based resin such as polyethylene, polypropylene, ethylenepropylene copolymer and polyolefin having a cyclo-type or norbornene structure, a carbonate-based resin, an acrylic resin, a vinyl chloride-based resin, a cellulose-based resin, an amide-based resin, an imide-based resin, a sulfone-based resin, a polyethersulfone-based resin, a polyether ether ketone-based resin, a polyphenylene sulfide-based resin, a vinyl alcohol-based resin, a vinylidene chloride-based resin, a vinyl butyral-based resin, an acrylate-based resin, a polyoxymethylene-based resin, a silicone-based resin, a urethane-based resin, a blend thereof, and a phenol-based, melamine-based, acryl-based, urethane-based, urethaneacryl-based, epoxy-based or silicone-based heat-curable or ultraviolet-curable polymer.

Accordingly, the light-transparent resin may be a resin where orientation birefringence due to shaping stress or the like is hardly produced (isotropic polymer) or easily produced (anisotropic polymer). A resin having excellent transparency in the visible light region is preferred.

EXAMPLES

Example 1

<Production of Transparent Film (Sample 1)>

The components in the Table below were charged in a sealed vessel and dissolved with stirring to produce a dope solution.

TABLE 1

| Components | |
| --- | --- |
| Cellulose triacetate with propionyl substitution degree of 0.83 and acetyl substitution degree of 1.55 (total substitution degree: 2.38) | 100 parts by weight |
| Glycerin diacetate oleate | 25 parts by weight |
| Methylene chloride | 481 parts by weight |
| Ethanol | 41 parts by weight |

Subsequently, using a belt casting apparatus, the dope solution was uniformly cast on a 1,500 mm-wide stainless steel band support at 33° C. The temperature of the stainless steel band was controlled to 25° C. The solvent was evaporated on the stainless steel band support until the residual solvent amount in the cast film became 25%, and the film was then separated from the stainless steel band support at a peel tension of 127 N/m. The separated cellulose triacetate film was dried by conveying it through a drying zone by means of a large number of rolls and simultaneously 30% stretched in the conveying direction to obtain Sample 1 of cellulose triacetate film having a thickness of 40 μm.

<Production of Transparent Film (Sample 2)>

The pellet of ZEONOR 1430R (norbornene-based ring-opening polymer hydride, produced by Zeon Corp., Tg: 138° C.) was melted in a single-screw extruder (manufactured by Mitsubishi Heavy Industries, Limited, inner diameter of cylinder: 90 mm, L/D of screw: 25) at a temperature of 240° C. to obtain a 100 μm-thick transparent resin. This transparent resin was delivered sequentially to a longitudinal uniaxial stretching apparatus of zone heating and a tenter stretching (transverse uniaxial stretching) apparatus, thereby effecting sequential biaxial stretching to obtain Sample 2 of 80 μm in thickness. The stretching temperature was 150° C. in both longitudinal stretching and transverse stretching, and the stretch ratio was 1.15 times in longitudinal stretching and 1.40 times in transverse stretching.

<Production of Transparent Film (Sample 3)>

The components in the Table below were charged in a sealed vessel and dissolved with stirring to produce a dope solution.

TABLE 2

| Components | |
| --- | --- |
| Cellulose acylate with acetyl substitution degree of 2.81 | 100 parts by mass |
| Triphenyl phosphate | 8 parts by mass |
| Biphenyl phosphate | 4 parts by mass |
| Retardation Raising Agent A shown below | 4 parts by mass |
| Methylene chloride | 631 parts by mass |
| Methanol | 94 parts by mass |

The obtained dope was cast on a glass plate, dried at room temperature for 1 minute and then dried at 70° C. for 6 minutes. The solvent residual amount after drying was 20 mass %. The cellulose acetate film formed was separated from the glass plate and dried at 100° C. for 10 minutes and further at 140° C. for 20 minutes. The dried film was 30% stretched in a direction orthogonal to the casting direction under the temperature condition of 155° C. to obtain Sample 3 of cellulose triacetate film having a thickness of 50 μm.
(Retardation Raising Agent A)

stretched in a direction orthogonal to the casting direction under the temperature condition of 155° C. to obtain Sample 5 of cellulose triacetate film having a thickness of 80 μm.
(Retardation Raising Agent B)

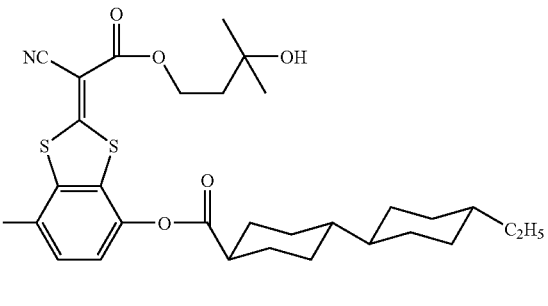

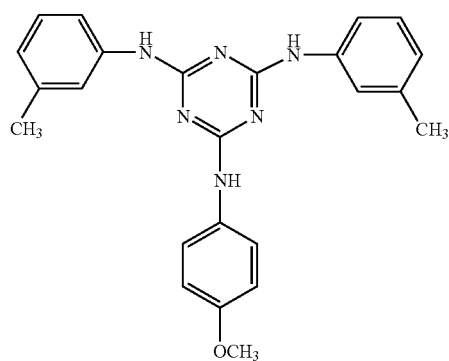 [SMILES: COc1ccc(Nc2nc(Nc3cccc(C)c3)nc(Nc3cccc(C)c3)n2)cc1]

<Production of Transparent Film (Sample 4)>

A dope solution was produced under the same conditions as for Sample 1 and cast using a belt casting apparatus. The cast film was separated from the support, dried by conveying it through a drying zone by means of a large number of rolls and simultaneously 65% stretched in the conveying direction to obtain Sample 4 of cellulose triacetate film having a thickness of 40 μm.
<Production of Transparent Film (Sample 5)>

The components in the Table below were charged in a sealed vessel and dissolved with stirring to produce a dope solution.

TABLE 3

| Components | |
|---|---|
| Cellulose acylate with acetyl substitution degree of 2.92 | 100 parts by mass |
| Triphenyl phosphate | 8 parts by mass |
| Biphenyl phosphate | 4 parts by mass |
| Retardation Raising Agent A | 3.5 parts by mass |
| Retardation Raising Agent B shown below | 5 parts by mass |
| Methylene chloride | 655 parts by mass |
| Methanol | 98 parts by mass |

The obtained dope was cast on a glass plate, dried at room temperature for 1 minute and then dried at 70° C. for 6 minutes. The solvent residual amount after drying was 20 mass %. The cellulose acetate film formed was separated from the glass plate and dried at 100° C. for 10 minutes and further at 140° C. for 20 minutes. The dried film was 20%

<Production of Transparent Film (Sample 6)>

Using Resin P1 described in Examples of JP-A-2006-188671, a colorless transparent cast film having a thickness of 150 μm and a residual solvent amount of 0.2% or less was obtained by a methylene chloride casting method. This film was heated at 195° C., transversely 125% stretched at a stretch rate of 220%/min, then cooled and taken out to produce Sample 6 having a thickness of 120 μm.
<Production of Transparent Film (Sample 7)>

A film produced under the same conditions as for Sample 3 and separated from a glass plate was 45% stretched at 185° C. to obtain Sample 7 of cellulose triacetate film having a thickness of 45 μm.
<Production of Transparent Film (Sample 8)>

A 110 μm-thick transparent resin produced under the same conditions as for Sample 2 was stretched 1.28 times in the longitudinal direction and 1.40 times in the transverse direction at a stretching temperature of 150° C. to obtain Sample 8 having a thickness of 80 μm.
<Production of Transparent Film (Sample 9)>

A polyimide having a structure shown below (weight average molecular weight (Mw): 120,000) was dissolved in methyl ethyl ketone to prepare a 15% polyiride solution. The polyimide solution prepared was coated on a cellulose acylate film (TAC-TD80U, produced by Fujifilm Corp.) and dried at 50° C. for 4 minutes, and the obtained laminate film was transversely 30% stretched at 180° C. to obtain Sample 9 having a thickness of 85 μm.
(Polyimide)

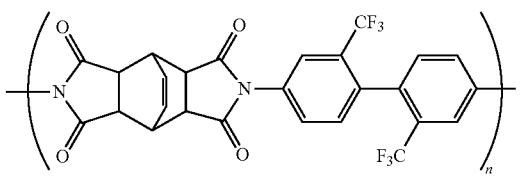

<Production of Transparent Film (Sample 10)>

A cellulose acylate film (TAC-TD80U, produced by Fujifilm Corp.) was used as Sample 10.
<Production of Transparent Film (Sample 11)>

A 110 μm-thick transparent resin produced under the same conditions as for Sample 2 was transversely stretched 1.40 times at a stretching temperature of 150° C. to obtain Sample 11 having a thickness of 85 μm.

The optical characteristics of produced transparent films are shown in the Table below.

TABLE 4

|  | Re(550) | Rth(550) | Re(630)-Re(450) | Rth(630)-Rth(450) |
|---|---|---|---|---|
| Sample 1 | 45 | 120 | 3 | 4 |
| Sample 2 | 45 | 120 | −1 | −2 |
| Sample 3 | 45 | 125 | −4 | −4 |
| Sample 4 | 95 | 120 | 7 | 4 |
| Sample 5 | 95 | 120 | 10 | 13 |
| Sample 6 | 95 | 120 | 11 | 14 |
| Sample 7 | 95 | 120 | −9 | −4 |
| Sample 8 | 95 | 120 | −1 | −2 |
| Sample 9 | 95 | 120 | −2 | −3 |
| Sample 10 | 5 | 40 | 1 | 5 |
| Sample 11 | 135 | 140 | −2 | −2 |

<Production of Polarizing Plate>

First, iodine was adsorbed to a stretched polyvinyl alcohol film to produce a polarizer.

Then, Samples 1 to 11 each was laminated to one surface of the polarizer by using a polyvinyl alcohol-based adhesives and a commercially available cellulose triacetate film (FUJI-TAC TD80UF, produced by Fujifilm Corporation) subjected to a saponification treatment was laminated to another surface of the polarizer by using a polyvinyl alcohol-based adhesive.

<Production of TN-Mode Liquid Crystal Display Device>

A pair of polarizing plates (upper polarizing plate and lower polarizing plate) provided in a liquid crystal display device using a TN-type liquid crystal cell (RDT197S, manufactured by MITSUBISHI) were stripped off and, instead, Polarizing Plates 1 to 11 produced above each was laminated to the backlight side through a self-adhesive agent by arranging the transparent film to locate on the liquid crystal cell side. Also, one sheet of the same Polarizing Plates 1 to 11 as that on the backlight side was laminated to the observer side by arranging the transparent film to locate on the liquid crystal cell side. At this time, respective polarizing plates were disposed such that the transmission axis of the backlight-side polarizing plate (upper polarizing plate) and the transmission axis of the observer-side polarizing plate (lower polarizing plate) were crossed at right angles.

<Evaluation of Display Performance>

The liquid crystal display devices above were left standing for 1 week in a room controlled to 25° C. and 60% RH and then measured for color tint, luminance, and contrast in 8 stages from black display (L0) to white display (L7) by using a measuring apparatus (EZ-Contrast 160D, manufactured by ELDIM).

In the Table below, $\Delta Cu'v'$ indicates the distance in a u'v' space when the viewing angle was inclined at 60° from the front (u'v': color coordinates in CIELAB space).

$$\Delta Cu'v' = ((u'(\text{front}) - u'(60°))^2 + (v'(\text{front}) - v'(60°))^2)^{0.5}$$

The contrast is a value calculated from the contrast ratio (transmittance at white display/transmittance at black display). Tie transmittance was measured by a measuring apparatus (EZ-Contrast 160D, manufactured by ELDIM)

<Evaluation Criteria>

(Evaluation Criteria of $\Delta Cu'v'$)
 A: $\Delta Cu'v'$ is less than 0.02,
 B: $\Delta Cu'v'$ is 0.02 or more and less than 0.04.
 C: $\Delta Cu'v'$ is 0.04 or more and less than 0.06.
 D: $\Delta Cu'v'$ is 0.06 or more.

(Evaluation Criteria of Contrast-Viewing Angle (Polar Angle Range in which the Contrast Ratio is 10 or more and Tone Reversal on the Black Side does not Occur))

A: The polar angle is 80° or more in up/down, right/left directions.

B: The polar angle is 80° or more in three directions out of up/down, right/left directions.

C: The polar angle is 80' or more in two directions out of up/down, right/left directions.

D: The polar angle is less than 80° in three direction out of up/down, right/left directions.

(Evaluation Criteria of Front Contrast)
 A: 800 or more.
 B: 700 or more.
 C: 600 or more.
 D: 599 or less.

TABLE 5

|  | $\Delta Cu'v'$ (L0 lateral) | $\Delta Cu'v'$ (L3 lateral) | Contrast-Viewing Angle | Front Contrast |
|---|---|---|---|---|
| Sample 1 | B | C | C | C |
| Sample 2 | B | C | C | C |
| Sample 3 | C | C | C | C |
| Sample 4 | B | D | B | B |
| Sample 5 | B | D | B | B |
| Sample 6 | B | D | B | B |
| Sample 7 | C | C | B | B |
| Sample 8 | B | C | B | B |
| Sample 9 | C | C | B | B |
| Sample 10 | C | C | D | D |
| Sample 11 | C | D | C | D |

The "L0 lateral" means a direction (lateral direction) of an azimuth angle of 0°/180° at black display (L0).

The "L3 lateral" means a direction (lateral direction) of an azimuth angle of 0°/180° at the time of setting a luminance level so that a luminance at the front has a half value of that at white display (L7).

By virtue of using the polarizing plate laminated with a transparent film exhibiting optical characteristics specified in the present invention, a liquid crystal display device satisfying both the contrast (front, viewing angle) and the change of color tint could be obtained.

Example 2

<Production of Scattering Film 1>
(Preparation of Coating Solution for Light Scattering Layer)

Coating Solution 1 shown below was filtered through a polypropylene-made filter having a pore size of 30 μm to prepare Coating Solutions 1 and 2 for Scattering Layer.

TABLE 6

| Components of Coating Solution 1 | |
|---|---|
| DPHA | 15 g |
| PETA | 73 g |
| Irgacure 184 | 1 g |
| Irgacure 127 | 1 g |
| Styrene particle of 5.0 μm | 8 g |
| Benzoguanamine particle of 1.5 μm | 2 g |
| MEK | 50 g |
| MIBK | 50 g |

The compounds used are shown below,

DPHA: A mixture of dipentaerythritol pentaacrylate and dipentaerythritol hexaacrylate (produced by Nippon Kayaks Co., Ltd.)

PETA: Pentaerythritol triacrylate (produced by Nippon Kayaku Co., Ltd.)

Irgacure 127: Polymerization initiator (produced by Ciba Specialty Chemicals Corp.)

Irgacure 184: Polymerization initiator (produced by Ciba Specialty Chemicals Corp.)

Styrene Particle (SX-500): crosslinked PSt particle having a size of 5 μm (produced by Soken Chemical & Engineering Co., Ltd.)

Benzoguanamine (EPOSTAR MS): Condensation product of benzoguanamine-formaldehyde, having a size of 1.5 μm (produced by Nippon Shokubai Co., Ltd.)

(Preparation of Coating Solution for Low Refractive Index)
(Preparation of Sol Solution)

In a reactor equipped with a stirrer and a reflux condenser, 120 parts by mass of methyl ethyl ketone, 100 parts by mass of acryloyloxypropyltrimethoxysilane (KBM-5103, produced by Shin-Etsu Chemical Co., Ltd.) and 3 parts by mass of diisopropoxyaluminum ethyl acetate were added and mixed and after adding 30 parts by mass of ion-exchanged water, the reaction was allowed to proceed at 60° C. for 4 hours. The reaction solution was cooled to room temperature to obtain a sol solution. The mass average molecular weight was 1,600 and out of the oligomer or higher components, the proportion of the components having a molecular weight of 1,000 to 20,000 was 100%. Also, the gas chromatography analysis revealed that the raw material acryloyloxypropyltrimethoxysilane was not remaining at all.

(Preparation of Liquid Dispersion A)

Acryloyloxypropyltrimethoxysilane (produced by Shin-Etsu Chemical Co., Ltd.) (30 g) and 1.5 g of diisopropoxyaluminum ethyl acetate were added and mixed to 500 g of a hollow silica fine particle sol (isopropyl alcohol silica sol, average particle diameter: 60 nm, shell thickness: 10 nm, silica concentration: 20 mass %, refractive index of silica particle; 1.31, produced according to Preparation Example 4 of JP-A-2002-79616 by changing the size) and after adding thereto 9 g of ion-exchanged water, the reaction was allowed to proceed at 60° C. for 8 hours. The reaction solution was then cooled to room temperature and 1.8 g of acetylacetone was added thereto. While adding cyclohexanone to 500 g of the obtained liquid dispersion to keep nearly constant the silica content, the solvent was displaced by reduced-pressure distillation. No foreign matter was generated in the liquid dispersion and when the solid content concentration was adjusted to 20 mass % with cyclohexanone, the viscosity at 25° C. was 5 mPa·s. The residual amount of isopropyl alcohol in Liquid Dispersion A obtained was analyzed by gas chromatography and found to be 1.5%.

(Preparation of Coating Solution for Low Refractive Index Layer)

A fluorine-containing polymer having an ethylenically unsaturated group (Fluorine Polymer (A-1) described in Production Example 3 of TP-A-2005-89536) in an amount of 41.0 g as the solid content was dissolved in 500 g of methyl isobutyl ketone. Furthermore, 260 parts by mass (52.0 parts by mass as the solid content of silica+surface treating agent) of Liquid Dispersion A, 5.0 parts by mass of DPHA and 2.0 parts by mass of Irgacure 127 (photopolymerization initiator, produced by Ciba Specialty Chemicals Corp.) were added. The resulting solution was diluted with methyl ethyl ketone such that the solid content concentration of the entire coating solution became 6 mass %, whereby the coating solution for low refractive index layer was prepared. The refractive index of the layer formed of this coating solution was 1.36.

(Coating of Light Scattering Layer)

A triacetyl cellulose film (TAC-TD80U, produced by Fujifilm Corporation) in a roll form was unrolled, and Coating Solution 1 for Light Scattering Layer was directly extruded and coated thereon by using a coater having a slot die. The coating solution was coated under the condition of a conveying speed of 30 m/min, dried at 30° C. for 15 seconds and further at 90° C. for 20 seconds, and then irradiated with an ultraviolet ray under nitrogen purging to an oxygen concentration of 0.2% by using an air-cooled metal halide lamp (manufactured by Eye Graphics Co., Ltd.) of 160 W/cm at an irradiation dose of 90 mJ/cm$^2$ to cure the coated layer, whereby a 8.0 μm-thick light scattering layer was formed. The resulting film was taken up. In this way, a light scattering layer was produced.

(Coating of Antireflection Film)

On the thus-obtained light scattering layer, the coating solution for low refractive index layer was coated using a coater having a slot die by extruding the coating solution directly on the surface coated with a hardcoat layer on a backup roll to form a 100 nm-thick low refractive index layer. The resulting film was then taken up. In this way, an antireflection film was produced. Drying and curing conditions are shown below.

Drying: The coating was dried at 90° C. for 60 seconds

Curing: The coating was irradiated with an ultraviolet ray by using an air-cooled metal halide lamp (manufactured by Eye Graphics Co., Ltd.) at an irradiation dose of 400 mJ/cm$^2$ in an atmosphere adjusted to an oxygen concentration of 0.1% by nitrogen purging.

<Production of Polarizing Plate with Scattering Film 1>

First, iodine was adsorbed to a stretched polyvinyl alcohol film to produce a polarizer.

Then, Scattering Film 1 was subjected to a saponification treatment and then laminated to one surface of the polarizer by using a vinyl alcohol-based adhesive such that the cellulose triacetate film came to the polarizer side. Furthermore, Samples 1 to 11 produced in Example 1 each was laminated to another surface of the polarizer by using a polyvinyl alcohol-based adhesive, whereby Polarizing Plate Samples 1-1 to 1-11 with Scattering Film 1 were produced.

<Scattering Film 2>

An anisotropic light scattering film produced by Toppan Printing Co., Ltd. (SDF Film (Diffuser), trade name, thickness: 25 μm) was used.

<Production of Polarizing Plate with Scattering Film>

On the cellulose triacetate film on one surface of each of Polarizing Plate Samples 1 to 11 produced in Example 1, Scattering Film 2 was stacked through an acrylic adhesive layer to produce Polarizing Plate Samples with Scattering Film 2-1 to 2-11. Scattering Film 2 was laminated to the polarizing plate such that the azimuthal angle at which the scattering intensity becomes maximum was located in the down direction of the liquid crystal cell, <Scattering Film 3>

Lumisty Film (produced by Sumitomo Chemical Co., Ltd.) which is an anisotropic scattering element was used.

<Production of Polarizing Plate with Scattering Film 3>

Scattering Film 3 was laminated to Polarizing Plate Samples 1 to 11 in the same manner as Scattering Film 2 to produce Polarizing Plate Samples with Scattering Film 3-1 to 3-11.

(Evaluation of Scattering Film)

The obtained antireflection films were evaluated for haze.

Scattering Films 1 to 3 were measured for haze in the direction inclined at 30° with respect to the film normal direction by using a haze meter (MODEL 1001 DP, manufactured by Nippon Denshoku Industries Co., Ltd.) in accordance with JIS-K-7105. As a result, Scattering Films 1 to 3 all showed a value of 30% or more.

<Production of TN-Mode Liquid Crystal Display Device>

The display device was produced in the same manner as in Example 1.

The same evaluations as in Example 1 were performed. The tone reversal angle was defined as an angle at which the brightness of L1/L2 in the down direction is reversed.

<Evaluation Criteria>

The same criteria as in Example 1 were used. The evaluation criteria of tone reversal are as follows.

(Evaluation Criteria of Tone Reversal)
- A: 40° or more
- B: not less than 30° and less than 40°
- C: not less than 20° and less than 30°
- D: not less than 10° and less than 20°

TABLE 7

|  | ΔCu'v' (L0 lateral) | ΔCu'v' (L3 lateral) | Contrast-Viewing Angle | Front Contrast | L1/L2 Tone Reversal Angle |
|---|---|---|---|---|---|
| Polarizing Plate 1-1 | A | A | B | D | B |
| Polarizing Plate 1-2 | A | A | B | D | B |
| Polarizing Plate 1-3 | B | A | B | D | B |
| Polarizing Plate 1-4 | A | B | A | C | B |
| Polarizing Plate 1-5 | A | B | A | C | B |
| Polarizing Plate 1-6 | A | B | A | C | B |
| Polarizing Plate 1-7 | B | B | A | C | B |
| Polarizing Plate 1-8 | A | B | A | C | B |
| Polarizing Plate 1-9 | B | B | A | C | B |
| Polarizing Plate 1-10 | C | C | D | D | C |
| Polarizing Plate 1-11 | C | D | B | D | B |
| Polarizing Plate 2-1 | B | C | B | C | C |
| Polarizing Plate 2-2 | B | C | B | C | C |
| Polarizing Plate 2-3 | C | C | B | C | C |
| Polarizing Plate 2-4 | B | D | B | C | B |
| Polarizing Plate 2-5 | B | D | B | C | B |
| Polarizing Plate 2-6 | B | D | B | C | B |
| Polarizing Plate 2-7 | C | C | B | C | B |
| Polarizing Plate 2-8 | B | C | B | C | B |
| Polarizing Plate 2-9 | C | C | B | C | B |
| Polarizing Plate 2-10 | C | C | D | D | D |
| Polarizing Plate 2-11 | C | D | B | D | C |
| Polarizing Plate 3-1 | B | C | B | C | B |
| Polarizing Plate 3-2 | B | C | B | C | B |
| Polarizing Plate 3-3 | C | C | B | C | B |
| Polarizing Plate 3-4 | B | D | B | C | B |
| Polarizing Plate 3-5 | B | D | B | C | B |
| Polarizing Plate 3-6 | B | D | B | C | B |
| Polarizing Plate 3-7 | C | C | B | C | B |
| Polarizing Plate 3-8 | B | C | B | C | B |
| Polarizing Plate 3-9 | C | C | B | C | B |
| Polarizing Plate 3-10 | C | C | D | D | C |
| Polarizing Plate 3-11 | C | D | B | D | B |

As seen from Table 7, the display performance of a liquid crystal display device stacked with a surface film shows an improvement effect in any one of the color tint change, contrast-viewing angle and tone reversal as compared with a liquid crystal display device not having a surface film.

What is claimed is:

1. A polarizing plate for a TN-mode liquid crystal display device, comprising:
   a polarizer;
   a pair of protective films sandwiching the polarizer, at least one of the protective films including an optical compensation sheet being of a single layer and satisfying formulae (1) and (4); and
   a scattering film on a side opposite to the optical compensation sheet across the polarizer, the scattering film satisfying formula (12):

$$40 \leq Re(550) \leq 130 \quad (1)$$

$$100 \leq Rth(550) \leq 150 \quad (4)$$

$$\text{Haze value} \leq 30\% \quad (12)$$

wherein $Re(\lambda)$ is an in-plane retardation value for light at a wavelength of $\lambda$ nm, $Rth(\lambda)$ is a retardation value in a thickness direction for light at a wavelength of $\lambda$ nm, and the haze value indicates a haze value of the scattering film in a direction 30 degree-inclined with respect to a normal direction of the scattering film, wherein the optical compensation sheet satisfies formulae (5) and (6), or the optical compensation sheet satisfies formulae (7) and (8):

$$Re(630) - Re(450) > 0 \quad (5)$$

$$Rth(630) - Rth(450) > 0 \quad (6)$$

$$Re(630) - Re(450) \leq 0 \quad (7)$$

$$Rth(630) - Rth(450) \leq 0 \quad (8),$$

wherein the optical compensation sheet contains a cellulose acylate, the cellulose acylate having substitution degrees satisfying formulae (9) to (11):

$$2.0 \leq X + Y \leq 3.0 \quad (9)$$

$$0 \leq X \leq 2.0 \quad (10)$$

$$0 \leq Y \leq 1.5 \quad (11)$$

wherein X represents a substitution degree of an acetyl group, and Y represents a total substitution degree of a propionyl group, a butyryl group, a pentanoyl group and a hexanoyl group, wherein the scattering film includes a light scattering layer containing a light-transparent resin and a light-transparent fine particle having a refracting index different from the light-transparent resin, and wherein a difference in refractive index between the light-transparent resin and the light-transparent fine particle is from 0.03 to 0.30.

2. The polarizing plate according to claim 1, wherein the optical compensation sheet satisfies formula (3):

$$70 < Re(550) \leq 110 \tag{3}$$

3. The polarizing plate according to claim 1, wherein the optical compensation sheet satisfies formulae (5) and (6):

$$Re(630) - Re(450) > 0 \tag{5}$$

$$Rth(630) - Rth(450) > 0 \tag{6},$$

wherein the optical compensation sheet does not satisfy formulae (7) and (8).

4. The polarizing plate according to claim 1, wherein the optical compensation sheet contains a retardation raising agent.

5. A TN-mode liquid crystal display device comprising a polarizing plate according to claim 1.

6. The polarizing plate according to claim 1, wherein the difference in refractive index between the light-transparent resin and the light-transparent fine particle is from 0.09 to 0.20.

* * * * *